United States Patent [19]
Hullett et al.

[11] Patent Number: 5,689,499
[45] Date of Patent: Nov. 18, 1997

[54] METHOD AND APPARATUS FOR MANAGING THE STATISTICAL MULTIPLEXING OF DATA IN DIGITAL COMMUNICATION NETWORKS

[75] Inventors: John Leslie Hullett, Daglish; Antonio Cantoni, City Beach; Zigmantas Leonas Budrikis, Dalkeith, all of Australia

[73] Assignee: Curtin University of Technology, Bentley, Australia

[21] Appl. No.: 500,844

[22] PCT Filed: Mar. 28, 1994

[86] PCT No.: PCT/AU94/00150

§ 371 Date: Aug. 4, 1995

§ 102(e) Date: Aug. 4, 1995

[87] PCT Pub. No.: WO94/23517

PCT Pub. Date: Oct. 13, 1994

[30] Foreign Application Priority Data

Mar. 26, 1993 [AU] Australia .................. PL7981

[51] Int. Cl.$^6$ ............................... H04L 12/56
[52] U.S. Cl. ............................ 370/235; 370/397
[58] Field of Search ............... 370/17, 60, 60.1, 370/94.1, 94.2, 108, 229, 230, 235, 236, 395, 397, 399

[56] References Cited

U.S. PATENT DOCUMENTS

| | | | |
|---|---|---|---|
| 5,173,897 | 12/1992 | Schrodi et al. | 370/60 |
| 5,260,935 | 11/1993 | Turner | 370/60 |
| 5,301,193 | 4/1994 | Toyofuku et al. | 370/94.1 |

FOREIGN PATENT DOCUMENTS

| | | |
|---|---|---|
| A41300/93 | 12/1993 | Australia . |
| 0548995A2 | 6/1993 | European Pat. Off. . |
| 0552121A1 | 7/1993 | European Pat. Off. . |
| WO 92/19060 | 10/1992 | WIPO . |
| WO 93/19551 | 9/1993 | WIPO . |

*Primary Examiner*—Melvin Marcelo
*Attorney, Agent, or Firm*—Larson and Taylor

[57] ABSTRACT

An apparatus and method are provided for supporting a plurality of virtual channel (VC) connections within a single virtual path (VP) in a digital communications network operating in the Asynchronous Transfer Mode (ATM). The apparatus (56) is combined with the cross-connected part of a conventional VC switch (54) to form a Data Switch (40). A VP switch (42) switches and terminates incoming bandwidth-resourced VPs on lines (48), some of which are carrying non-bandwidth-resourced VCs and switched onto lines 50 on the output side of VP switch 42. VPs on lines (50) are switched and multiplexed by the Data Switch (40). Buffers (66) store cells and a VP rate server. The buffers (66) are significantly larger than in a conventional VC switch to enable smoothing of data flow peaks associated with data flowing from multiple bandwidth resourced VP tributaries into single resourced VP tributaries. Despite the large buffers in the Data Switch (40) congestion may result when data bursts occur on several converging streams. When buffer overflow is threatened, Data Switch (40) discards whole frames, i.e., whole VPI-VCI sequences marked with an end of transmission delimiter in the PTI, rather than individual cells originating from different frames as with normal ATM cell multiplexing.

19 Claims, 7 Drawing Sheets

METHOD AND APPARATUS FOR MANAGING THE STATISTICAL MULTIPLEXING OF DATA IN DIGITAL COMMUNICATION NETWORKS

FIELD OF THE INVENTION

This invention relates to managing the statistical multiplexing of data in digital communication networks which employ the Asynchronous Transfer Mode of multiplexing, transmission and switching.

BACKGROUND OF THE INVENTION

The telephone industry is moving within the Standardisation Sector of the International Telecommunications Union to define the concept of a Broadband Integrated Services Network or B_ISDN. This B_ISDN is to be capable of providing a complete range of services, including telephone, television and data, with all services being multiplexed onto the network over a defined User Network Interface (UNI). Switches within the network are interconnected over a defined Network Node Interface (NNI).

Information for all services within the Broadband Integrated Services Network is conveyed and switched in irregularly occurring fixed size segments called cells, with the method of cell handling referred to as the Asynchronous Transfer Mode (ATM). ATM is a connection oriented technique where ATM level connections are established between service users by means of a call set up or signalling process, or alternatively administratively by network management. Connections may be established for the duration of a call or information transfer, or they may be established on a permanent or semi-permanent basis. The ATM cell has a header block which carries a label necessary to associate cells belonging to the same virtual connection.

In terms of protocol architecture the ATM layer sits immediately above the physical or transmission layer, and has two hierarchical sub-layers. These are the lower Virtual Path (VP) sub-layer and the higher Virtual Channel (VC) sub-layer. The Virtual Channel describes the unidirectional flow of ATM cells marked by a unique identifier called the Virtual Channel Identifier (VCI) which is carried in the cell header. The Virtual Channels are associated by a common unique identifier called the Virtual Path Identifier (VPI) which is also carried in the cell header. Virtual Channels are thus transported within Virtual Paths which are used to aggregate the Virtual Channels.

In accepting connections over the B_ISDN the network operator needs to confirm that sufficient network resources are available to sustain the connection end-to-end at its required Quality of Service and without affecting the service guarantees of the existing connections. To assist in the process of Connection Admission Control the network user is required to characterise its traffic and specify the required Quality of Service. The digital information generated by a source may be characterised by its average bit rate, burstiness, peak duration and other such measures. However for purposes of ATM connection admission, ITU Draft Recommendation I.371 sets out that the traffic on a requested connection be characterised solely by the peak cell rate. If adequate network resources are available to sustain a new connection at its required Quality of Service at the indicated peak cell rate, the connection would be accepted by the network which would then monitor the traffic flow to ensure that the agreed rate is not violated. Although ITU Recommendation 1.371 indicates that other parameters besides peak cell rate may be introduced in the future, the present provision is for peak cell rate only, and the provision applies to connections equally at the VP and the VC sublayers.

To assist in the understanding of the significance of the present invention, it is useful to explain why for ATM carried communications in general, definite restrictions on traffic rates over both VP and VC connections are necessary, not only because of the provisions of the ITU Recommendation but for satisfactory operation of the ATM network. An accepted precept for the ATM network is that switching will be done in both the VP and the VC levels. Switching at the VP level would mean that ATM cells entering an input port of a switch would according to the particular VPI label be transferred to a specific output port and be given a specific new VPI label. The VCI portions of the total VPI-VCI label would be unchanged. Switching at the VC level would mean that cells entering an input port of a switch would according to the particular VPI-VCI label be transferred to a specific output port and be given a specific VPI-VCI label.

A switch will in general have multiplicities of input and output ports. The maximum rates at which cells can arrive at input ports and can be taken away from output ports will be set by interface specifications, but must in all cases be definite and finite values. The management of rates at which communications on ATM connections may proceed should ensure that the rate at which cells arrive at any output port of a switch does not exceed the rate at which cells can be taken away from that port.

In the case of VP switching, it must be assured that the sum of rates of the totality of VP connections that are switched to any particular output port does not exceed the capacity of the physical interface at that port. In the case of VC switching it must be assured that the sum of all VC connections that are switched to any particular VP at a particular output port does not exceed the rate allocated to that VP connection, and the sum of rates allocated to VP connections at the given output port does not exceed the capacity of the physical interface at that port. The separate restriction on rates allowed to VP connections that emanate from an output port is made necessary by the possibility that the next switching node would be a VP level switch. Assurances that traffic on VC connections would not exceed set rates would generally be provided by User-Network traffic Contracts and monitoring of that traffic by the network under the provisions of ITU Recommendation L371 as already indicated. Assurances that traffic on VP connections would not exceed set rates would generally be provided by Connection Admission Control that would not place more VC connections within any given VP connection than can satisfy the given constraint. It will also be possible for a user to obtain a VP connection under contract with the network in an identical manner to that of a VC connection when the assurance that traffic on the VP connection would not exceed that set rate would be obtained in an identical manner to that for a VC connection.

ATM related Quality of Service is to be rated in terms of such parameters as the end-to-end cell transfer delay, cell delay variation, cell loss ratio and cell error ratio. The generally acceptable end-to-end delay will be only of the order of a thousand cell periods. Therefore the allowable delay per switching node can only be of the order of a hundred cell periods (above referred to as cell service intervals). Accordingly, general ATM switches offering either virtual path or virtual channel switching are expected to employ small buffers of no more than several hundred cell capacity with the switch loading kept at such a level as to ensure acceptable cell loss levels resulting from switch buffer overflow. Switch loading is managed by the combination of Connection Admission and Route Selection procedures.

To provide a data service for N end users over the ATM network one may in the extreme envisage the use of a set of N(N−1) fully meshed connections. These connections would be set up on a permanent or semi-permanent basis reflecting the practice on Local Area Networks (LANs) where no connection set-up is required for sessions. In this respect data networks differ from voice networks where connections are set up and torn down on a regular basis and sessions or calls last only for short periods. If the ATM network, whether private or public, is to offer Quality of Service guarantees those N(N−1) connections across the User Network Interface must be bandwidth resourced with sufficient bandwidth provided to accommodate the peak cell flow rates on these connections. Since data traffic is generally bursty in nature it may be possible with little loss of efficiency to use fewer bandwidth-resourced connections by aggregating the traffic from groups of users by means of statistically multiplexing. Such multiplexing may be at a protocol level above the ATM protocol layer where the information is not yet segmented into ATM cells. This could be at the ATM Adaption Layer (AAL), or even higher.

For data services there are several different AAL layers which may be used and these provide among other functions the segmentation service wherein information for example in the form of data frames from higher layers are mapped into ATM cells and vice versa. However, the multiplexing of whole frames at the AAL layer greatly increases the processing load on the network.

SUMMARY OF THE INVENTION

It is an object of the present invention to provide a method and apparatus for managing the statistical multiplexing of data in a digital communication network.

According to one aspect of the present invention there is provided a method for supporting a plurality of virtual channel connections within a single virtual path in a digital communications network operating in the Asynchronous Transfer Mode (ATM), where said virtual channel connections have no guarantees of rate at which cells on that connection can be transmitted, but also have no restriction on said rate save that inherent on said virtual path connection, said method comprising the steps of:

storing cells arriving for transmission on said virtual path in a buffer for transmission of cells on said virtual path in conformance with said constraint on said rate;

detecting whether buffer overflow is threatened by the storage of further cells arriving for transmission on said virtual path; and, while buffer overflow is threatened, admitting for storage in said buffer cells only on such of said virtual channel connections on which the previous cell admitted was not indicated by the header of said previous cell as being the end of transmission on said virtual channel; and, at all times not admit for storage in said buffer any cells on said virtual channel connections for which since the previous indication of said end of transmission on said virtual channel connection there has been any rejection of cells for storage.

According to another aspect of the present invention there is provided a method for supporting a plurality of virtual paths on a single physical cell transmission system in a digital communications network operating in the Asynchronous Transfer Mode (ATM), each virtual path supporting a plurality of virtual channel connections, where each said virtual path has an individual rate constraint, the method comprising steps of:

storing cells arriving for transmission on any one of said virtual paths in a common buffer for transmission on said physical cell transmission system;

scheduling the stored cells for transmission on said physical cell transmission system at time instants that conform with said individual rate constraints on said virtual paths, and preserving the order of transmission cells on a said virtual path to the order of arrival for said path;

detecting whether buffer overflow is threatened by the storage of further cells for transmission on any of said virtual paths, and detecting whether said scheduling on a particular virtual path is over a specified limit; and for any cell arriving for transmission on a given virtual path, while buffer overflow is threatened or the scheduling for said virtual path is over the specified limit, admitting for storage in said buffer and scheduling for transmission cells only on such of said virtual channel connections on which the previous cell admitted was not indicated by the header of said previous cell as being the end of transmission on said virtual channel; and, at all times not admit for storage in said buffer any cells on said virtual channel connections for which since the previous indication of said end of transmission on said virtual channel connection there has been any rejection of cells for storage.

According to another aspect of the present invention there is provided an apparatus for supporting a plurality of virtual channel connections within a single virtual path in a digital communications network operating in the Asynchronous Transfer Mode (ATM), where said virtual channel connections have no guarantees of rate of which cells on that connection can be transmitted, but also have no restriction on said rate save that inherent on said virtual path connection, where said constraint on said virtual path connection is in terms of a specified shortest allowed time interval between successive cells on said virtual path, said apparatus comprising:

means for storing cells arriving for transmission on said virtual path in a buffer for transmission of cells on said virtual path in conformance with said constraint on said rate;

means for detecting whether buffer overflow is threatened by the storage of further cells arriving for transmission on said virtual path; and, means for admitting for storage in said buffer while buffer overflow is threatened cells only on such of said virtual channel connections on which the previous cell admitted was not indicated by the header of said previous cell as being the end of transmission on said virtual channel, and wherein said admitting means at all times does not admit for storage in said buffer any cells on said virtual channel connections for which since the previous indication of said end of transmission on said virtual channel connection there has been any rejection of cells for storage.

According to another aspect of the present invention there is provided an apparatus for supporting a plurality of virtual paths on a single physical cell transmission system in a digital communications network operating in the Asynchronous Transfer Mode (ATM), each virtual path supporting a plurality of virtual channel connections, where each virtual path has an individual rate constraint said apparatus comprising:

means for storing cells arriving for transmission on any one of said virtual paths in a common buffer for transmission on said physical cell transmission system;

means for scheduling the stored cells for transmission on said physical cell transmission system at time instants that conform with said individual rate constraints on said virtual paths, and preserving the order of transmission of cells on a said virtual path to the order of arrival for said path;

means for detecting whether buffer overflow is threatened by the storage of further cells for transmission on any of said virtual paths, and detecting whether said scheduling on a particular virtual path is over a specified limit; and for any cell arriving for transmission on a given virtual path; and, means for admitting for storage in said buffer and scheduling for transmission while buffer overflow is threatened or the scheduling for said virtual path is over the specified limit, cells only on such of said virtual channel connections on which the previous cell admitted was not indicated by the header of said previous cell as being said end of transmission on said virtual channel, and wherein said admitting means at all times does not admit for storage in said buffer any cells on said virtual channel connections for which since the previous indication of said end of transmission on said virtual channel connection there has been any rejection of cells for storage.

According to another aspect of the present invention there is provided a method of scheduling the reading out of a data cell from a buffer onto on output comprising the steps of:

calculating a service time S for the reading out of said data cell from said buffer, said service time comprising a delay period measured from the actual time of arrival $t_a$ of a cell to said buffer, said delay equal to at least the difference between an expected arrival time of that cell and the actual arrival time $t_a$ when said cell arrives earlier than expected, and said delay equal to zero when said cell arrives on time or later than expected; and, reading out said cell at said service time S or at the next time available on said output in the event that said output is not available for reading said cell at said service time S.

According to another aspect of the present invention there is provided an apparatus for scheduling the reading out of data cells from a buffer onto a data output comprising:

means for calculating a service time by reading out said data cells from said buffer, said service time comprising a delay period measured from the actual time of arrival $t_a$ of a cell to said buffer, said delay equal to at least the difference between the expected arrival time of that cell and the actual arrival time $t_a$ when said cell arrives on earlier than expected, and said delay equal to zero when said cell arrives on time or later than expected; and, means for reading out said cell at said service time S or at the next time available on said output in the event that said output is not available for reading said cell at said service time S.

BRIEF DESCRIPTION OF THE DRAWINGS

In order to facilitate a better understanding of the nature of the invention a preferred embodiment of the invention will now be described in detail, by way of example only, with reference to the accompanying drawings in which.

DETAILED DESCRIPTION OF THE PREFERRED EMBODIMENT

Figure 1:
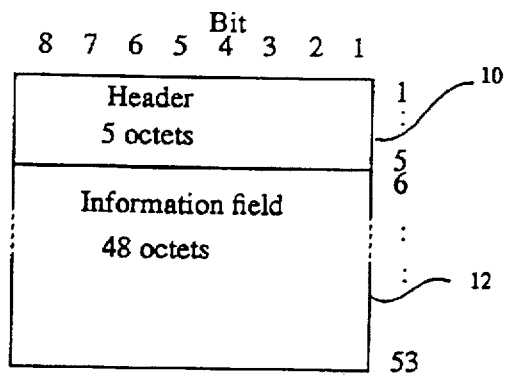
FIG. 1 depicts the typical structure of an ATM cell.

With ATM all information to be transferred across the B_ISDN UNI or NNI is in the form of fixed sized segments called cells. Referring to FIG. 1, each cell comprises fifty three (53) octets of information, arranged as a five octet header 10 and a forty eight (48) octet information field 12. The ATM cell header contains the VPI and VCI fields which carry the labels necessary to associate cells belonging to the same Virtual Path and Virtual Circuit respectively as well as a Payload Type Indicator (PTI).

Table 1 describes the coding recommended for the PTI field in the UNI and NNI cell headers respectively. With this coding bits 4, 3 and 2 refer to the bit position in the ATM cell header 10. When the bit in position 4 is set to zero the cell is characterised as one originating from a network user and sent across the UNI. For such cells the bit in position 2 is available for user signalling. As explained hereinafter, it is required that a cell marking the end of a transmission sequence be identified. Bit 2 can be used to mark a cell which is the last of a transmission sequence.

TABLE 1

| PTI Coding Bits 432 | Interpretation |
|---|---|
| 000 | User data cell, congestion not experienced. ATM-layer-user-to-ATM-layer-user indication = 0 |
| 001 | User data cell, congestion not experienced. ATM-layer-user-to-ATM-layer-user indication = 1 |
| 010 | User data cell, congestion experienced. ATM-layer-user-to-ATM-layer-user indication = 0 |
| 011 | User data cell, congestion experienced. ATM-layer-user-to-ATM-layer-user indication = 1 |
| 100 | OAM F5 segment associated cell |
| 101 | OAM end-to-end associated cell |
| 110 | Resource management cell |
| 111 | Reserved for future functions |

Figure 2:
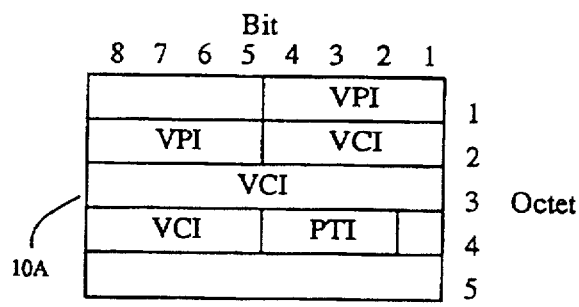
FIG. 2 depicts the cell header of the ATM cell illustrated in FIG. 1 at a User Network Interface.

Referring to FIG. 2, the structure of the header 10A at the UNI is such that the VPI is contained in the upper four bits and lower four bits of the first and second octets respectively. The VCI is contained in the upper four bits of the second octet, the whole of the third octet and the lower four bits of the fourth octet. The PTI is contained at bit positions 4, 3 and 2 in the fourth octet.

Figure 3:
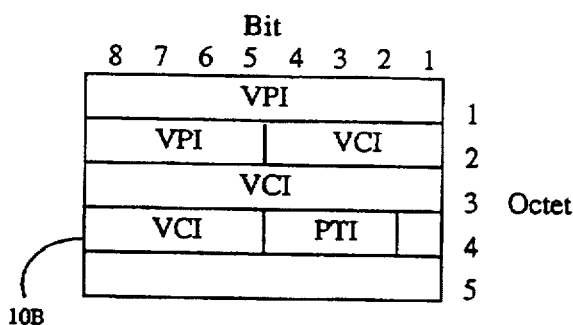
FIG. 3 depicts the cell header of the ATM cell illustrated in FIG. 1 at a Network Node Interface.

The structure of the header 10B at the NNI, shown in FIG. 3, differs from that at the UNI in that the whole of the first octet and the lower four bits of the second octet are reserved for the VPI. The location and size of the VCI and PTI fields are the same in the header 10B of the NNI as that in header 10A at the UNI.

Figure 4:
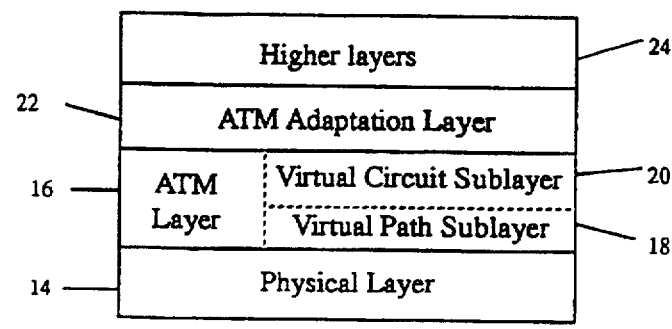
FIG. 4 depicts the B_ISDN layered architecture.

The protocol reference model for the B_ISDN is illustrated in FIG. 4. Here the lower or physical layer 14 is responsible for the transmission and reception of ATM cells over one of a variety of transmission media and transmission systems. Above the physical layer is the ATM layer 16 which comprises the Virtual Path sublayer 18 and Virtual Channel sublayer 20. At the ATM layer cells from individual VPs and VCs are multiplexed at the UNI into a composite stream for transmission, and arriving cells split into individual tributaries according to their VPI and VCI. The ATM Adaption layer (AAL) 22 sits above the ATM layer and is responsible, among other functions, for the segmentation of large data frames into the ATM cell payloads and vice versa. Finally, higher protocol layers 24 lie above the AAL 22.

Figure 5:
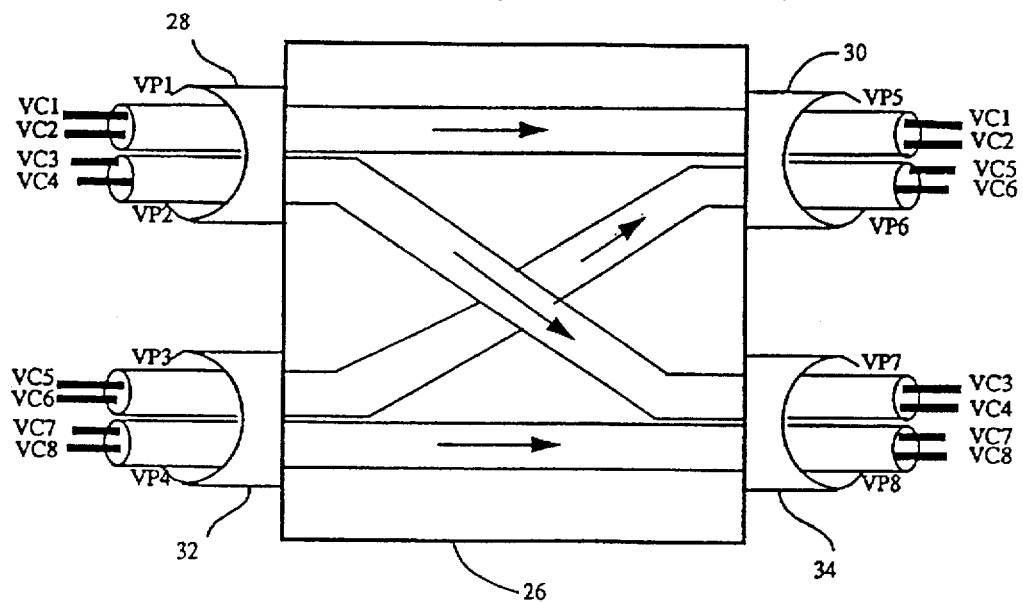
FIG. 5 is a representation of a conventional Virtual Path (VP) Switch.

Bandwidth resourced Virtual Path and Virtual Channel cell, streams, sufficient to accommodate the agreed peak cell rates, are switched within the ATM network. Referring to FIG. 5, a VP switch 26 terminates incoming Virtual Paths and cross-connects incoming VPs to outgoing VPs according to the required destinations. The VPI may be reassigned in the switching process but the VCs within each VP remain intact with the VCI values remaining unchanged. In FIG. 5 reference numbers 28, 30, 32 and 34 represent physical layer transmission systems which may use, for example, transmission media such as co-axial cables, optical fibres or radio links. Each carry multiple VPs. For example, physical layer 28 carries VPs labelled VP1 and VP2. VP1 is shown being switched to physical layer 30 where it is re-labelled as VP5. VP2 on the other hand is switched to physical layer 34 where it is re-labelled as VP7. In this VP switching process the VCs VC1, VC2, VC3 and VC4 retain their label identifications within their respective VPs.

Figure 6:
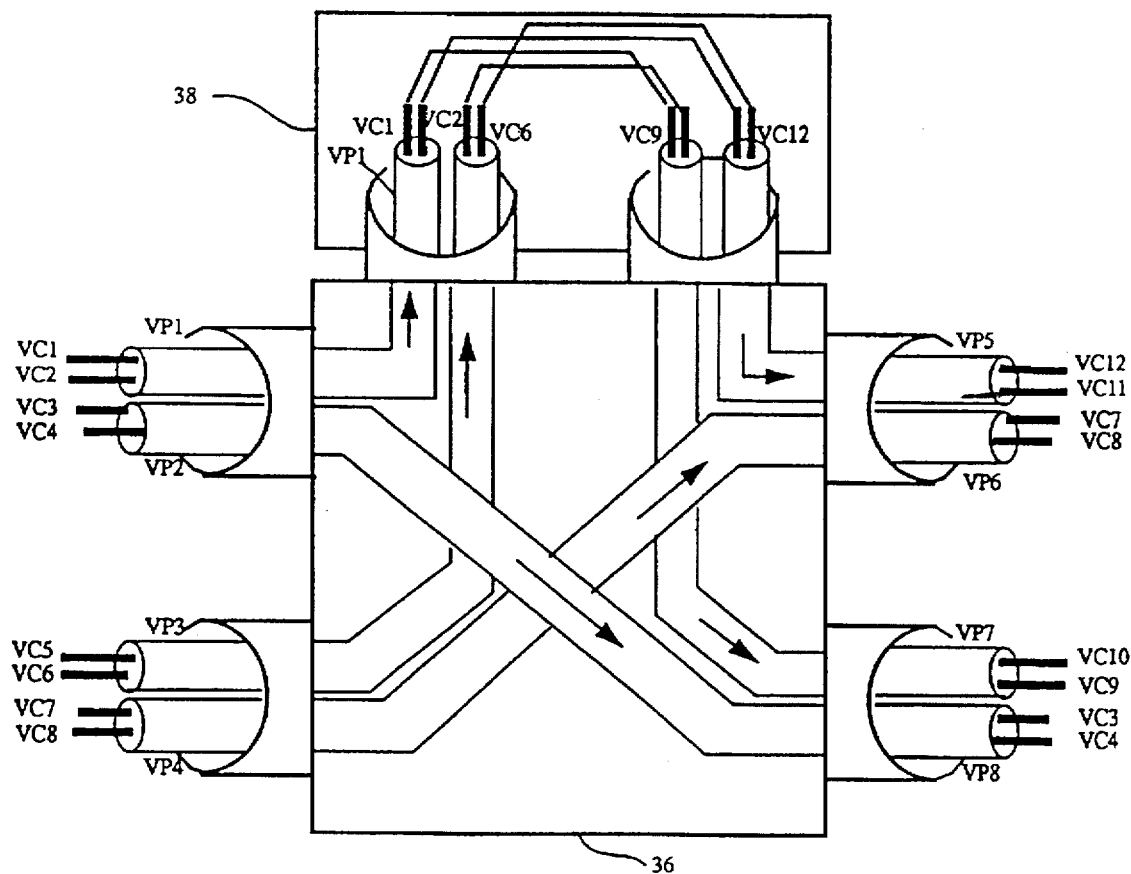
FIG. 6 is a representation of a conventional Virtual Channel and Virtual Path switch.

FIG. 6 shows a combined switch comprising a VP switch 36 and a VC switch 38. VC switch 38 terminates both bandwidth resourced VC and VP connections and switches the VCs within a VP independently of each other. VC switch 38 would normally handle bandwidth resourced VCs carrying a mix of traffic types including those like voice and video, which are real-time and delay-sensitive, and accordingly its internal output buffer is relatively small to satisfy the relevant network delay budgets.

In this combined switch VP2 and VP4 are switched only by the VP switch 36 and their VCs remain intact. On the other hand VP1 and VP3 are terminated at the VC switch 38 where the VCs they are carrying are themselves terminated, cross-connected and re-labelled. For example the VC1 and VC2 carried within VP1 are switched through the VC switch 38 into VP7 and VP5 respectively and re-labelled as VC9 and VC11 respectively. Because of switching within the ATM network the VPI and VCI values associated with a particular connection may be different at the two ends, ie at an input UNI and an output UNI.

ATM switches (ie., VP and VC switches), or cross-connecting nodes, are seen from the above descriptions to perform two main functions: the directing of cells from their inputs to their dedicated outputs, and the translation, where relevant, of cell VPIs and VCIs. To avoid cell loss caused by two or more cells simultaneously competing for the same output, internal switch buffers are provided. Because the ATM switches are deployed in switching resourced connections with necessary small throughput delay these buffers would have a capacity of no more than in the order of several hundred cells.

Figure 7:
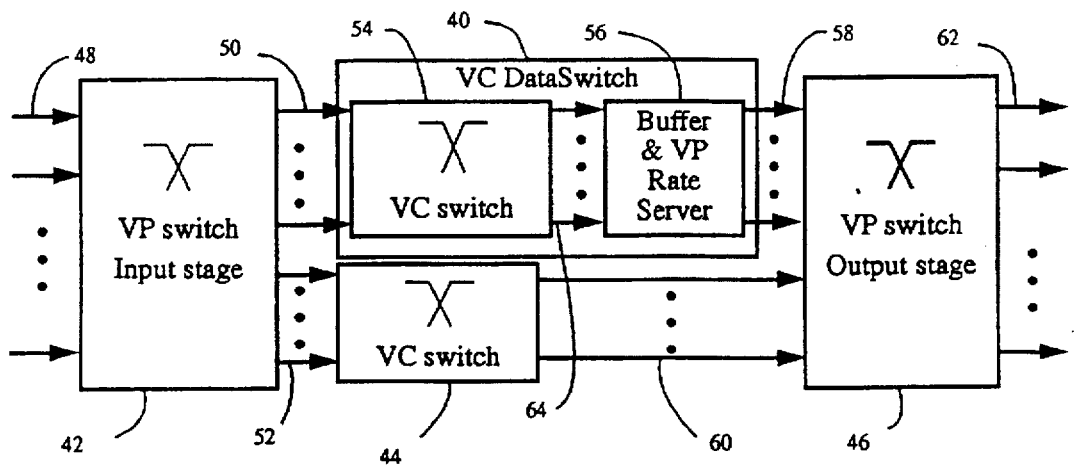
FIG. 7 is a representation of an apparatus in accordance with the present invention connected between conventional VP switches.

FIG. 7 illustrates how an apparatus 56 embodying the present invention would be deployed within an ATM network incorporating an input stage VP switch 42 and an output stage VP switch 46. The apparatus 56 is combined with the cross-connect part of a conventional VC switch 54 to form a Data Switch 40. The Data Switch 40 and a VC switch 44 are connected in parallel between VP switch 42 and VP switch 46.

VP switch 42 switches and terminates incoming bandwidth-resourced VP's on lines 48, some of which are carrying non-bandwidth-resourced VC's and switched onto lines 50 on the output side of VP switch 42. VP's on lines 50 are switched and multiplexed by the Data Switch 40. Remaining lines 52 from VP switch 42 bear VP's which may carry bandwidth-resourced VCs and are switched by the VC switch 44 similar to that described earlier in relation to FIG. 6. Buffer overflow in the VC switch 44 may be kept to a very low level by the action of Connection Admission Control exercised by network management. Connection Admission Control limits the number of connections handled and keeps the traffic flow rates on those connections admitted to the rates negotiated at connection set-up.

Apparatus 56 includes output buffers and a VP rate server. The VP rate server controls the writing in and reading out of cells in the output buffers. The output buffers are much larger than those in conventional VC switch 44 which switches bandwidth-resourced VC connections. Transmission lines 58 provide for transmission of cells between outputs of the apparatus 56 and the VP switch 46. Transmission lines 60 provide for transmission of cells between VC switch 44 and VP switch 46. Cells output from VP switch 46 are transmitted on lines 62. It is noted that the cell flow rates on interconnections 64 between outputs of VC switch 54 and buffer inputs of apparatus 56 are much larger than those on lines 48, 50, 52, 60, 58 and 62. This ensures that the VPs on interconnections 64 can accommodate without loss the possible convergence of concurrent cells from VPs on lines 50.

Notwithstanding the very large output buffers in the apparatus 56, buffer overflow might occur when data bursts occur on several converging streams to an input of the apparatus 56, with consequent cell loss, if it were not for the preventative strategy exercised by the apparatus 56. When buffer overflow is threatened apparatus 56 discards whole newly arriving frames, that is whole VPI-VCI sequences marked with an end of transmission delimiter in the PTI, rather than individual cells from different frames or VPI-VCI sequences. Frame discarding on a cell by cell basis ceases when the buffer occupancy falls below the selected threshold level. In relation to cell output, data cells on the relevant VCs are read from the apparatus 56 buffers by its rate servers on the output VPs on lines 58 according to the rate parameters agreed for each. These VPs, together with those from the VC switch 50 on lines 62, are then able to be switched and multiplexed by the VP switch Output stage 46 in the normal way as described earlier in relation to FIG. 5.

Figure 8:
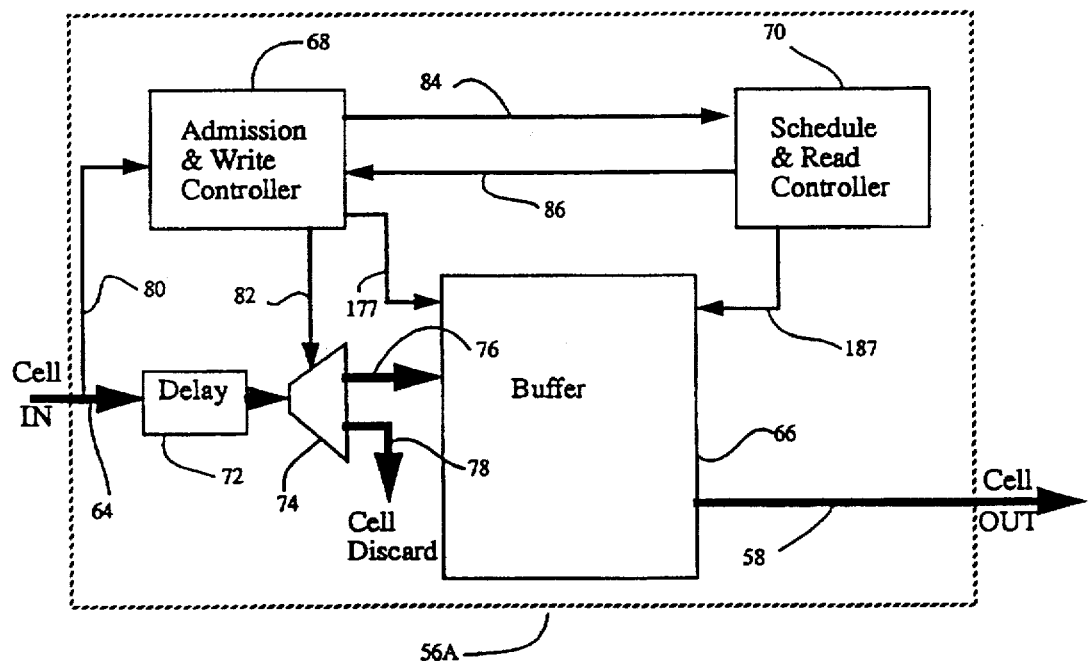
FIG. 8 is a representation of a logical implementation of the buffer and VP rate server of the apparatus represented in FIG. 7.

FIG. 8 shows a logical schematic of one realisation of the apparatus 56. The arrangement of only a single input to one interconnection 64, and a single output on line 58, is shown since this is replicated for the other interconnections 64, and lines 58.

The apparatus 56 includes a buffer 66 for storing cells arriving on an input coupled to interconnection 64, an Admission and Write Controller (AWC) 68 for selectively writing cells into the buffer 66 and a Schedule and Read Controller (SRC) 70 for selectively reading out cells from the buffer to an output connected to the output line 58. A Delay element 72 is provided to allow sufficient time for cell-header processing by the Admission and Write Controller 68 before each arriving cell is forwarded to a mux 74 for either entry into the Buffer via 76 or discarding via 78.

If the occupancy of the Buffer 66 is such that the Data Switch 40 is accepting new transmissions or data frames, the AWC 68 reads the arriving cells into the appropriate buffer addresses, whether or not these cells are carrying frame segments from the beginning, continuation or end-of-frame, and sends to the SRC 70 on line 84 the address used, the cell VPI and the arrival time $t_a$ for each cell. The AWC 68 also notifies the buffer 66 on line 177 of the address at which the arriving cell is to be stored. If the Buffer occupancy is above the threshold level at which the apparatus 56 does not accept new data frames it reads into the Buffer 66 only those arriving cells which carry the continuation or end-of-frame segments of frames whose first cell had been stored previously, and rejects cells carrying new beginning-of-frame or new frame-continuation and end-of-frame segments. Sufficient storage is kept in the Buffer 66 beyond the level where new frames are rejected to accommodate the continuation of frames that have cells which were already stored in buffer 66 when new-frame discarding commenced. In this way, the AWC acts as a means for detecting whether buffer overflow is threatened by the storage of further cells arriving at its input and admitting for storage in buffer 66 under overload-threat conditions only cells from frames having at least one cell previously stored in the buffer 66.

Figure 9:
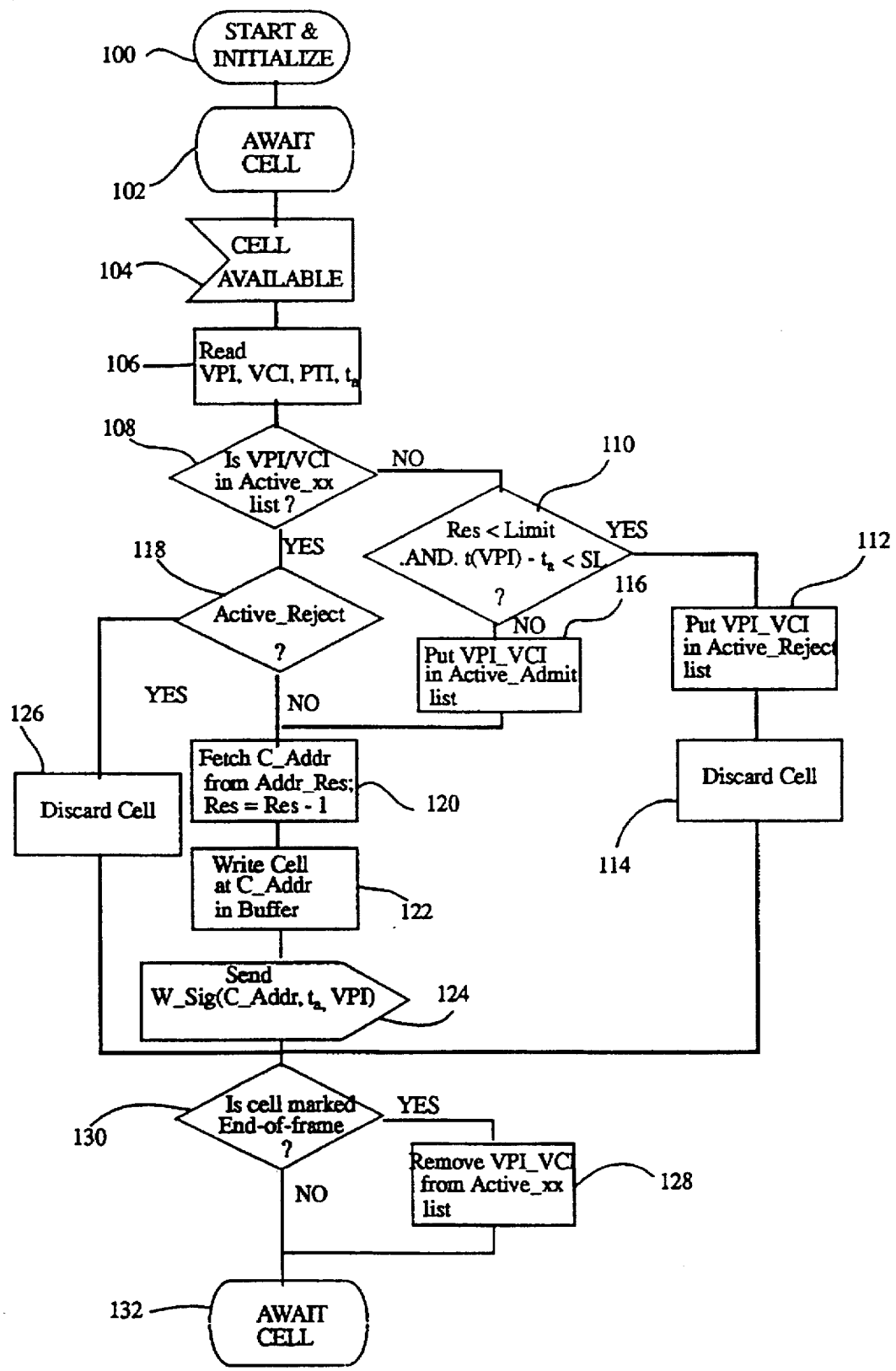
FIG. 9 illustrates part of the implementation of an Admission and Write Controller element of the apparatus represented in FIG. 8.

FIG. 9 describes one implementation of the Admit and Write operations of the AWC 68 of the apparatus 56. The modus operandi is such that following the initialisation at 100, the Controller enters a WAIT state 102, where it awaits the arrival of a cell from line 64 onto an input.

When a cell arrives on line 64, the arrival is signalled to the AWC 68 via line 80 and received at 104. At state 106 the AWC reads the cell identifier information such as VPI, VCI and PTI from its header together with its time of arrival, $t_a$. If the cell is the first to arrive on that particular VPI/VCI, it will not be on an Active-xx list as determined by 108 and the operational state of the AWC 68 proceeds to 110. (The Active_xx lists at 108 include both an Active_Admit list and an Active_Reject list). Then at 112, if the reserve, Res, of memory locations in buffer 66 has fallen below a threshold or limit, the cell VPI/VCI is put in the Active_Reject list and, to avoid possible buffer overflow, the cell is discarded at 114.

The Discard Cell operation at 114 causes a signal to be sent on line 82 (refer FIG. 8) to the multiplexer 74, causing it to discard the cell it received via the Delay element 72. This discard operation is in fact a logical rather than a physical one, since Cell Discard causes the cell not to be read into the buffer 66. The Limit used at 110 acts as the decision threshold for the rejection of cells carrying segments from new data frames, ie frames for which no segments had yet been stored in the buffer 66. At 110, if the reserve, Res, of memory address locations has not fallen below the set Limit, and if $t(VPI)-t_a$ is less than the schedule limit, SL, its VPI/VCI is put on the Active_admit list at 116. However, if the cell VPI/VCI read at 108 is on the Active list and not, as tested at 118 marked for discarding by being on the Active-Reject list, the cell is stored by 122 at the current address, C-Addr, fetched by 120 from the address reserve list, Addr_Res. The address C_Addr, together with the cell's time of arrival, $t_a$, and its VPI are passed by 124 via line 84 to the Schedule and Read Controller, 70. If at 118 it is determined that the cell is on the Active_reject list it is marked for discarding, and subsequently discarded at 126.

When a memory address is taken at 120 from the address reserve list, Addr_Res, the number of addresses in reserve, Res, is decremented by one. Any cell, whether it be written to memory at 122, or discarded at 112 or 126, will after one of these actions eventually have its VPI/VCI removed from the Active_xx list at 128 if it is identified by 130 as containing an end-of-free segment. End-of-frame information is obtained at 106 from the PTI, held within the cell header 10 (refer FIGS. 1–3). The process then returns at 132 to the AWAIT CELL state.

Figure 10:
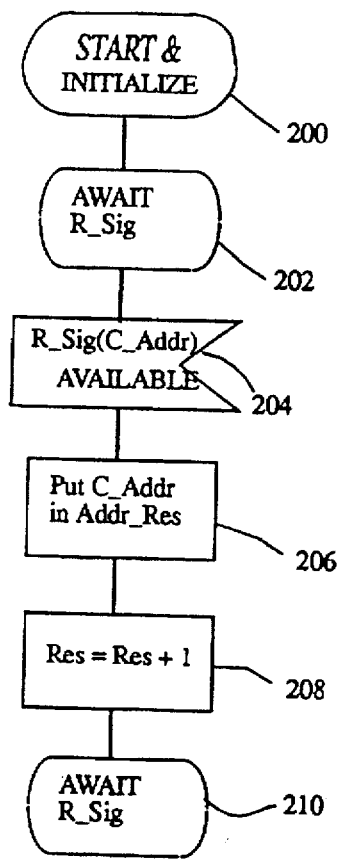
FIGS. 10 and 10A illustrate the remainder of the implementation of the Admission and Write Controller element of the apparatus.

FIG. 10 describes one implementation of the Address manager operation of the Admission and Write Controller 68 of apparatus 56. Together, the operations described in FIGS. 9 and 10 and 10A comprise the whole functionality of the AWC 68. The modus operandi of the address manager is such that following initialisation of the operation at 200 it enters a state, at 202, where it awaits the arrival of a reader signal, R_Sig(C_Addr), from the Schedule and Read Controller 70. The R_Sig (C_Addr) is transmitted on line 86 from the SRC 70 to the AWC 68 (refer FIG. 9).

The availability of the reader signal, R_Sig(C_Addr), is indicated by 204. The reader signal, R_SIG(C_Addr), conveys to the Address manager of the Admission and Write Controller 68 information on which addresses may be added to its address reserve list, Addr_Res, by virtue of the fact that the cells they had contained have been read. The addresses received at 204 are added to the address reserve list, Addr_Res, at 206. Following the addition of an address to the reserve list at 206 the number of addresses in reserve for buffering cells, Res, is incremented by one at 208. The manager then returns at 210 to the AWAIT R_SIG state.

Figure 10A:
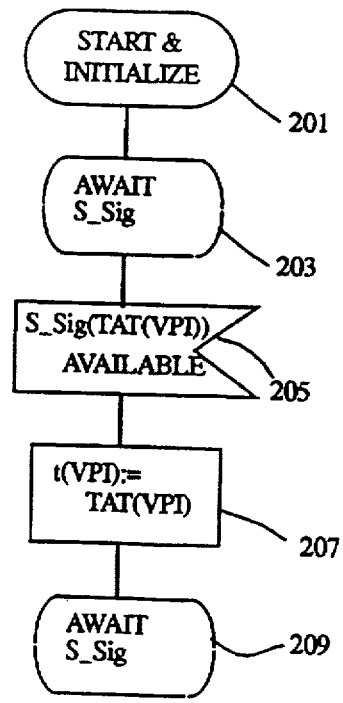

FIG. 10A describes one implementation of the schedule monitor operation of the Admission and Write Controller 68 of the Data Switch 40. The modus operandi of the schedule monitor is such that following initialisation of the operation at 201 it enters a state, at 203, where it awaits the arrival of a schedule signal, S-Sig(TAT(VPI)), from the Schedule and Read Controller 70 of the Data Switch 40. The S-Sig(TAT (VPI)) is transmitted on line 86 from the SAC 70 to the AWC 68 (refer FIG. 8). The availability of the schedule signal, S-Sig(TAT(VPI)), is indicated by 205. The schedule signal, S-Sig(TAT(VPI)) conveys to the schedule monitor of the Admission and Write Controller 68 the current theoretical arrival time on the particular VPI. This is recorded at 207 as t(VPI). The monitor returns at 209 to the AWAIT S-Sig state.

The output physical link 58 on the output of the apparatus 56 may carry a number of different VPs. The rate of data flow on each of these VPs must be scheduled so as to satisfy the traffic parameters negotiated for each with the ATM network management. The SRC 70 achieves this by the use of rate shaping by virtual scheduling and implemented by linked lists used to read data buffer 66 into bandwidth resourced output VPs. The concept of peak-rate shaping VP connections by not allowing cells on a particular VP to flow with a spacing closer than T, where 1/T is the nominated peak rate, is specified in Recommendation L371 of the B_ISDN. However, in this embodiment of the apparatus 56 peak rate shaping is implemented by the use of linked lists. The linked list method provides, via a set of pointers, the association and sequence of buffer addresses which contain the ATM cells scheduled for output at each particular cell-start instant on the output VP.

The scheduling of a cell for output at a particular instant involves the calculation of a delay which represents the enforced time spacing between the cell arrival and its earliest allowable departure time according to the peak-rate scheduling method used. The actual cell departure times will vary from the theoretical due to the unavoidable time-slotting of cell departures and the contention for output service by cells from the various VPs sharing the output line.

In the implementation of the Schedule and Read Controller element 70, VP scheduling is on a first-in-first-out basis according to the negotiated peak cell rate. This follows Recommendation I 371 for the B_ISDN. However VP scheduling is not limited in relation to the nature of the traffic parameter specification used since scheduling may be applied to other regimes such as, for example, average cell rate with restricted burstiness and peak duration.

The VCs within each VP carried on the apparatus 56 output to line 58 are not rate shaped and do not have to be resourced. Switching and multiplexing of these VCs onto a single VP is via the VC switch part 54 of the Data Switch 40 as shown in FIG. 7. Scheduling of each VP by the Schedule and Read Controller element 70 of the apparatus 56 and Data Switch 40 is without regard to the VCs they contain.

Figure 11:
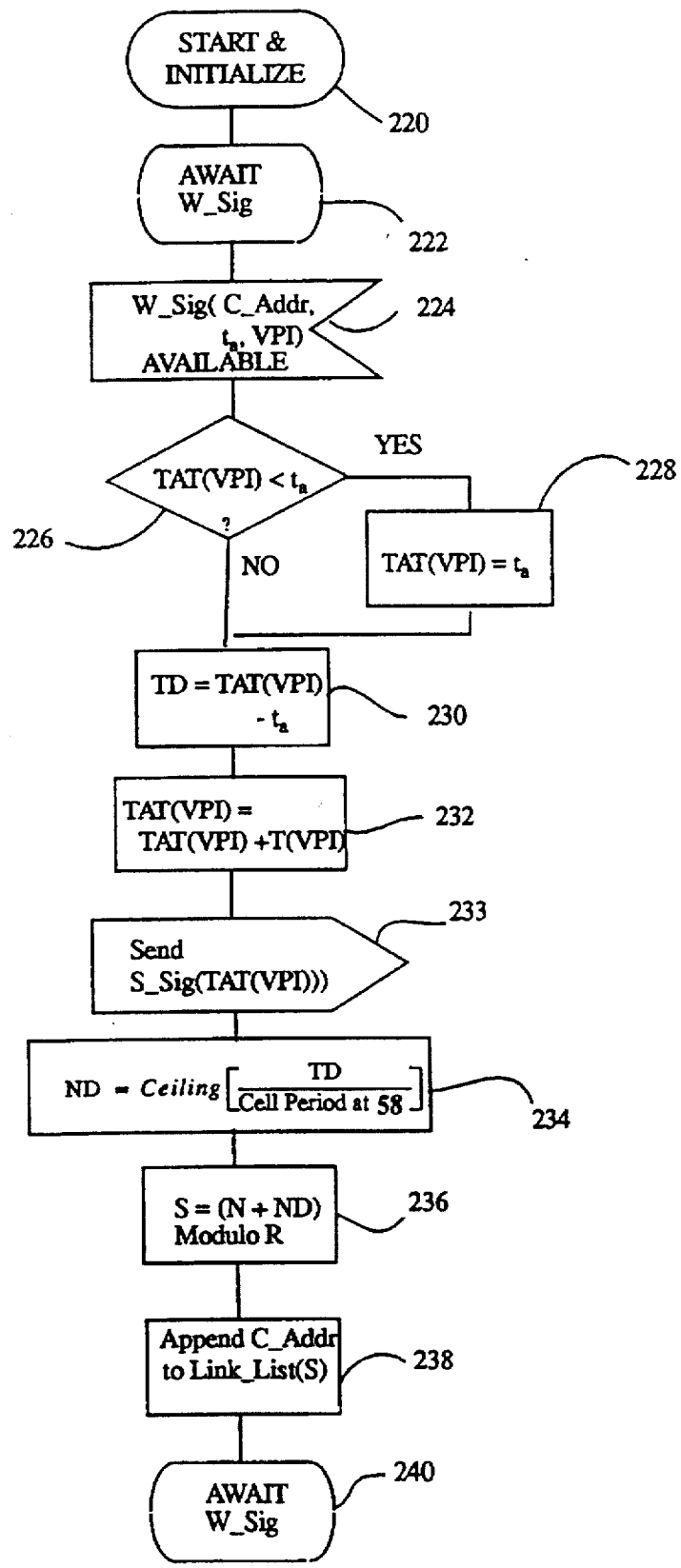
FIG. 11 illustrates the implementation of the Schedule part of a Schedule and Read Controller element of the apparatus; and, FIG. 12 illustrates the Read Controller part of the implementation of the Schedule and Read Controller element of the apparatus.

FIG. 11 gives the implementation of the Schedule part of the Schedule and Read Controller 70. The modus operandi of the Schedule is such that following the initialisation of the operation at 220, the Schedule awaits at state 222 the arrival via 84 (refer FIG. 8) of the writer signal, W_Sig, from the Admission and Write Controller 68. The availability of the writer signal is indicated by 224 whereby the Schedule receives information that a cell with a particular VPI and which arrived at time $t_a$ has been written to a specific memory address, C_Addr. The time $t_a$ would normally be expressed in units such as microseconds.

The expected arrival time of cells with a particular VPI and according to the specific peak rate agreed for that VPI is referred to in the implementation as TAT(VPI). As determined by 226, if the cell arrives later than expected, ie if TAT(VPI)<$t_a$, 228 resets TAT(VPI)=$t_a$. Then for the TAT (VPI) state 230 estimates a scheduling time delay for service, TD equal to the difference between the expected arrival time TAT(VPI) and the actual arrival time $t_a$, ie TD=TAT(VPI)-$t_a$ Hence if a cell arrives earlier than expected the schedule programs a delay for service, TD.

At 232 the expected arrival time for the next cell with that particular VPI is calculated based on the last value of TAT(VPI) plus T, where T is the reciprocal of the peak cell transmission rate for that VPI. Thus T(VPI)=1/(Peak cell rate for VPI)

At 233 the new valve of TAT(VPI) is sent as the signal S-Sig(TAT(VPI)) on line 86 to the admission and write controller 68.

At 234 TD is expressed in terms of an integer number of cell service intervals, ND, where the cell service interval is the reciprocal of the cell transmission rate at the output to line 58, ie ND=Ceiling(TD/cell transmission rate at 58)

wherein Ceiling (x) is x if x is a whole integer; and, the next whole integer greater than x if x is not a whole integer.

At 236 the cell is scheduled for service at time S, expressed as ND service intervals after the current service interval beginning at time N. The range of service periods, R, is sufficiently large that a single VPI buffer could fill before R would be exhausted. The apparatus 56 contains a buffer for each VPI. The individual buffers are ideally logical divisions within a single physical buffer. At 238 the scheduled service time for the cell which arrived at time $t_a$ and which is stored at address C-Addr is appended to a linked list to be operated on by the Read Controller part of the Schedule and Read Controller element 70. The process then returns at 240 to the AWAIT W_Sig state.

Figure 12:
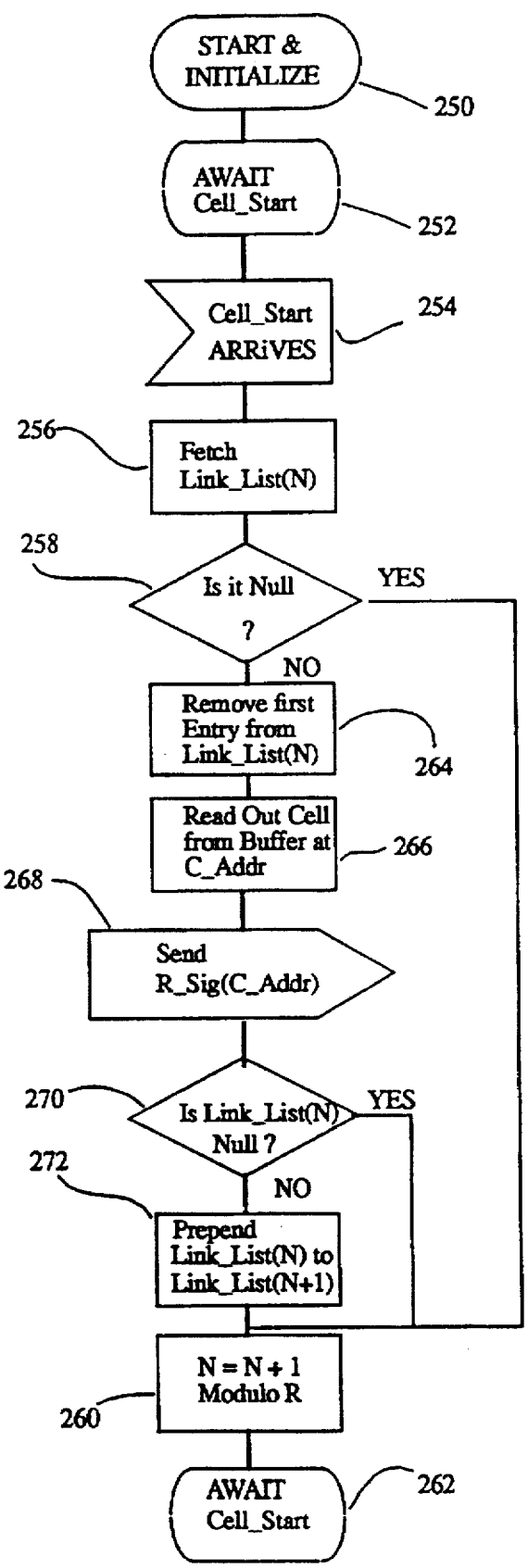

FIG. 12 gives the implementation of the Read Controller part of the Schedule and Read Controller 70. The Read Controller reads onto the output connected to line 58 cells which have been scheduled for service by the Schedule. Timing for the read operation, ie Cell Start, is derived internally from the digital network clock at 58. The clock pulse coincident with the beginning of the first octet of a cell forms a Cell Start. On the initialisation of the process at 250 an AWAIT state is entered at 252 where it awaits the arrival of the Cell Start. After a Cell Start arrives at 254, the Read Controller at state 256 fetches the linked list of tasks scheduled for service at that time. If, as determined at state 258, no tasks are scheduled for the current cell service interval, ie if there are no cells to be read, 260 increments N by one and operation at state 262 awaits the next Cell Start. If, as determined at state 258, there are tasks scheduled for the current cell service interval, N, the Read Controller at state 264 removes the first entry from the linked list at N and 256 then reads to the output the cell at the appended address. Since this address location is thus freed state 268 advises the Admission and Write Controller via the R_Sig on line 86. If, as determined in state 270, there are no other tasks scheduled for N, state 260 increments N by one and operation awaits the next cell start at state 262. Otherwise the remaining tasks are re-scheduled by 272 to the next cell period where they will be served ahead of tasks already scheduled at N+1.

The implementations given in FIGS. 9, 10, 10A, 11 and 12 do not describe how the mutual exclusion of shared resources, such as variables and linked lists, is achieved. Techniques for this are well known to persons skilled in the art and contained in references such as by M. Ben-Ari, ("Principles of Concurrent and Distributed Programming" Prenice Hall, 1990).

By the application of the preferred embodiment of this invention, particularly in the form of a Data Switch in an ATM network, it is possible to discard whole VPI-VCI sequences or whole frames at the ATM protocol layer and avoid multiple frame destruction through cell loss multiplication by discarding of individual cells from multiple frames when buffer overflow is threatened. Such a management strategy, if implemented in the ATM adaption layer or higher layers would greatly increase processing overheads.

As is evident from the above description the apparatus 56 and Data Switch 40 enables switching and multiplexing of the data streams carried on non-bandwidth resourced, non rate shaped VC connections within bandwidth resourced, rate shaped VPs.

Notwithstanding the large buffers in the apparatus 56 there may still be congestion when data bursts occur on several VC data streams converging to a single input. The apparatus 56 is however able to operate under sustained overload conditions when ATM cells arrive at its output buffer 66 at a rate higher than the VP service rate. Under these conditions, when buffer overflow is threatened, the apparatus 56 discards whole frames rather than individual cells originating from different frames as would be the case with normal ATM cell multiplexing. The apparatus 56 is able to identify which cells mark the beginning and end of the segmented data frame by means of identifier information in the cell heading such as a Payload Type Indicator (PTI) which delineates the end of frame on a particular VC. When buffer overflow occurs in the conventional ATM-layer cell multiplexer, single discarded cells can result in the loss of whole segmented data frames comprising multiple cells producing cell loss multiplication.

Since embodiments of the present invention incorporate very large buffers, with a correspondingly long fill-time, it is possible to reactively renegotiate with the ATM network management the level of bandwidth resource associated with the serving VP. Consequently, when a buffer is seen to be filling rapidly, one may increase the server VP bandwidth providing for a higher cell, and hence frame, output rate. Such reactive negotiation of network resources is less effective with conventionally sized ATM switch buffers and networks which cover wide areas with very high speed links.

Various prior art schemes have been suggested to counter buffer overflow in ATM switches but these differ from that used by the Data Switch which also avoids cell loss multiplication. One such scheme, described by Gersht and Lett, ("A Congestion Control Framework for ATM Networks" IEEE Journal on Selected Areas in Communications, Vol. 9, No. 7, September 1991, pp 1119–1130), includes the use of feedback control signals to limit or choke for a period the cell flow rate on VCs feeding the overflowing buffer. Another scheme, described by Turner, ("Design of Local ATM Networks" INFOCOM 1993), proposes the dropping of a fraction of the tributary VCs. This has the unfortunate effect of stopping all data traffic on those stopped VCs. On the other hand, in the Data Switch of the preferred embodiment, cells associated with whole new frames are discarded while guaranteeing the passage of those frames which are in transit. No particular VC is cut off and each has an equal chance of getting a data frame through the network when the buffer occupancy falls sufficiently to allow readmission of new frames.

Various cell flow shaping methods, to achieve particular traffic parameters, may be applied to the VC cell flows to the apparatus 56. The implementation of the preferred apparatus 56 described herein uses, by way of example and not by way of limitation, unshaped VC cell flows reflecting the practice on Local Area Networks (LANs) where no bandwidth restrictions are placed on data input rates other than those set by the capacity of the physical layer transmission. Within the apparatus implementation described the bandwidth restriction is set by that allowed for the VPs carrying the VC data flows.

Numerous variations and modifications to the described embodiment of the apparatus and method of the invention will suggest themselves to persons skilled in the electronics and the telecommunications art, in addition to those already mentioned, without departing from the basic inventive concepts. For example, another method that may be used as a basis for admitting or discarding each newly arrived frame is one which makes a decision based on the current value of two parameters, viz the current level of buffer fill, and the number of frames which have been accepted by the Data Switch and which are currently in transit through it. In this context, a frame "in transit" is one which has at least one of its cells in the Data Switch buffer awaiting output service. With this method a new frame would be accepted if it is judged that the level of unused buffer capacity is sufficient to cater for transit as well as the cells from the new frame. Furthermore, the apparatus of the invention does not preclude a mode of operation wherein it can handle within the one implementation the switching and multiplexing of both bandwidth resourced and non-bandwidth resourced VCIs although these two categories of VCI must necessarily be associated with different VPIs. This is necessary since the non-resourced VCIs would not be switched by the normal VCI switches whereas the bandwidth resourced VCIs may be. In its preferred form, the invention is implemented in an ATM digital communications network, however it may also have application in other environments. All such variations and modifications are to be considered within the scope of the present invention, the nature of which is to be determined from the foregoing description and the appended claims.

The claims defining the invention are as follows:

1. A method for supporting a plurality of virtual channel connections within a single virtual path in a digital communications network operating in the Asynchronous Transfer Mode (ATM), where said virtual channel connections have no guarantees of rate at which cells on that connection can be transmitted, but also have no constraint on said rate save that inherent on said virtual path connection, said method comprising the steps of:

storing cells arriving for transmission on said virtual path in a buffer for transmission of cells on said virtual path in conformance with said constraint on said rate;

detecting whether buffer overflow is threatened by the storage of further cells arriving for transmission on said virtual path; and, while buffer overflow is threatened, admitting for storage in said buffer cells only on such of said virtual channel connections on which the previous cell admitted was not indicated by the header of said previous cell as being end of transmission on said virtual channel; and, at all times not admit for storage in said buffer any cells on said virtual channel connections for which since the previous indication of said end of transmission on said virtual channel connection there has been any rejection of cells for storage.

2. A method according to claim 1, wherein the detection of threatened buffer overload is made on the assessment of the number of unoccupied locations in said buffer at the time of arrival of a cell for said transmission.

3. A method according to claim 2, wherein buffer overload is deemed to be threatened when the number of unoccupied locations in said buffer at the time of arrival of a cell for said transmission is less than a threshold level.

4. A method according to claim 3, wherein said threshold level dynamically varies dependent on the rate of cells incoming for said transmission and the rate of reading cells out of said buffer.

5. A method for supporting a plurality of virtual paths on a single physical cell transmission system in a digital communications network operating in the Asynchronous Transfer Mode (ATM), each virtual path supporting a plurality of virtual channel connections, where each said virtual path has an individual rate constraint, the method comprising steps of:

storing cells arriving for transmission on any one of said virtual paths in a common buffer for transmission on said physical cell transmission system;

scheduling the stored cells for transmission on said physical cell transmission system at time instants that conform with said individual rate constraints on said virtual paths, and preserving the order of transmission cells on a said virtual path to the order of arrival for said path;

detecting whether buffer overflow is threatened by the storage of further cells for transmission on any of said virtual paths, and detecting whether said scheduling on a particular virtual path is over a specified limit; and for any cell arriving for transmission on a given virtual path, while buffer overflow is threatened or the scheduling for said virtual path is over the specified limit, admitting for storage in said buffer and scheduling for transmission cells only on such of said virtual channel connections on which the previous cell admitted was not indicated by a header of said previous cell as being an end of transmission on said virtual channel; and, at all times not admit for storage in said buffer any cells on said virtual channel connections for which since the previous indication of said end of transmission on said virtual channel connection there has been any rejection of cells for storage.

6. A method according to claim 5, wherein the detection of scheduling on a virtual path being over the limit is made on the assessment of time delay on said virtual path.

7. A method according to claim 6, wherein scheduling on a virtual path is deemed as over the limit if at the time of arrival of a cell the last scheduled cell on said virtual path is for a time later than said arrival time plus a fixed threshold level.

8. A method according claim 5, further comprising the step of forming an admit list (AL) and a reject list (RL) on the basis of cells arriving for transmission for determining on which virtual channel connections cells are to be admitted or rejected for storage in said buffer, said lists being formed by reading the identifier information and end transmission information in the header of a cell, and said AL and RL carrying entries of said identifier information however applicable, and in the event of a cell arriving for transmission and not marked a end of transmission, then if said identifier information of said cell matches that on said RL, the cell is rejected; if it does not match any on said RL and if it does match on said AL, the cell is admitted; if it matches neither said RL nor AL and if buffer overflow is threatened or the scheduling for said virtual path is over the limit, the cell is rejected and entered on said RL, and otherwise the cell is admitted and entered on said AL; and in the event a cell arrives with end of transmission indicated, then if said identifier matches said RL then the cell is rejected and its identifier is cleared from said RL, and if its identifier does not match said RL and matches said AL, the cell is admitted and its identifier cleared from the said AL; and if the identifier does not match either said RL or said AL, the cell is admitted or rejected depending on the state of buffer and scheduling of the virtual path without being entered in either said RL or said AL.

9. A method according to claim 8, wherein said identifier information consists of a Virtual Path Identifier and Virtual Channel Identifier and said end of transmission information is a unique code point of a Payload Type Identifier of a cell.

10. A method according to claim 5, wherein said constraint on said virtual path connection is in terms of specified shortest allowed time interval between successive cells on said virtual path.

11. An apparatus for supporting a plurality of virtual channel connections within a single virtual path in a digital communications network operating in the Asynchronous Transfer Mode (ATM), where said virtual channel connections have no guarantees of rate of which cells on that connection can be transmitted, but also have no constraint on said rate save that inherent on said virtual path connection, where said constraint on said virtual path connection is in terms of a specified shortest allowed time interval between successive cells on said virtual path, said apparatus comprising:

means for storing cells arriving for transmission on said virtual path in a buffer for transmission of cells on said virtual path in conformance with said constraint on said rate;

means for detecting whether buffer overflow is threatened by the storage of further cells arriving for transmission on said virtual path: and, means for admitting for storage in said buffer while buffer overflow is threatened cells only on such of said virtual channel connections on which the previous cell admitted was not indicated by the header of said previous cell as being the end of transmission on said virtual channel, and wherein said admitting means at all times does not admit for storage in said buffer any cells on said virtual channel connections for which since the previous indication of said end of transmission on said virtual channel connection there has been any rejection of cells for storage.

12. An apparatus according to claim 11, wherein the detection of threatened buffer overload is made on the assessment of the number of unoccupied locations in said buffer at the time of arrival of a cell for said transmission.

13. An apparatus according to claim 12, wherein buffer overload is deemed to be threatened when the number of unoccupied locations in said buffer at the time of arrival of a cell for said transmission is less than a threshold level.

14. An apparatus according to claim 13, wherein said threshold level dynamically varied dependent on the rate of cells incoming for said transmission and the rate of reading cells out of said buffer.

15. An apparatus for supporting a plurality of virtual paths on a single physical cell transmission system in a digital communications network operating in the Asynchronous Transfer Mode (ATM), each virtual path supporting a plurality of virtual channel connections, wherein each virtual path has an individual rate constraint said apparatus comprising:

means for storing cells arriving for transmission on any one of said virtual paths in common buffer for transmission on said physical cell transmission system;

means for scheduling the stored cells for transmission on said physical cell transmission system at time instants that conform with said individual rate constraints on said virtual paths, and preserving the order of transmission of cells on a said virtual path to the order of arrival for said path;

means for detecting whether buffer overflow is threatened by the storage of further cells for transmission on any said virtual paths, and detecting whether said scheduling on a particular virtual path is over a specified limit; and, means for admitting for storage in said buffer and scheduling for transmission while buffer overflow is threatened or the scheduling for said virtual path is over the specified limit, cells only on such of said virtual channel connections on which the previous cell admitted was not indicated by a header of said previous cell as being an end of transmission on said virtual channel, and wherein said admitting means at all times does not admit for storage in said buffer any cells on said virtual channel connections for which since the previous indication of said end of transmission on said virtual channel connection there has been any rejection of cells for storage.

16. An apparatus according to claim 15, wherein the detection of scheduling on a virtual path being over the limit is made on the assessment of time delay on said virtual path.

17. An apparatus according to claim 15, wherein scheduling by said scheduling means on a virtual path is deemed as over the limit if at the time of arrival of a cell the last scheduled cell on said virtual path is for a time, later than said arrival time plus a fixed threshold level.

18. An apparatus according to claim 15, further comprising means for forming an admit list (AL) and a reject list (RL) on the basis of cells arriving for transmission for determining on which virtual channel connections cells are to be admitted or rejected for storage in said buffer, said lists being formed by reading the identifier information and end of transmission information in a cell, and said AL and RL carrying entries of said identifier information, and in the event of a cell arriving for transmission and not marked as end of transmission, then if said identifier information of said cell matches that on said RL, the cell is rejected; if it does not match any on said RL and if it does match on said AL, the cell is admitted; if it matches neither said RL nor said AL and if buffer overflow is threatened or the scheduling for said virtual path is over the limit, said cell is rejected and entered on said RL, and otherwise said cell is admitted and entered on said AL; and in the event a cell arrives with end of transmission indicated, then if said identifier matches said RL then said cell is rejected and its identifier is cleared from said RL, and if its identifier does not match said RL and matches said AL, said cell is admitted and its identifier cleared from said AL; and if the identifier does not match either said RL or said AL, the cell is admitted or rejected depending on the state of buffer and scheduling of the virtual path without being entered in either said RL or said AL.

19. An apparatus according to claim 18, wherein said identifier information consisting of Virtual Path Identifier and Virtual Channel Identifier and said end of transmission information being unique code point of Payload Type Identifier of a cell.

* * * * *

(12) EX PARTE REEXAMINATION CERTIFICATE (8254th)
United States Patent
Hullet et al.

(10) Number: US 5,689,499 C1
(45) Certificate Issued: May 24, 2011

(54) METHOD AND APPARATUS FOR MANAGING THE STATISTICAL MULTIPLEXING OF DATA IN DIGITAL COMMUNICATION NETWORKS

(75) Inventors: John Leslie Hullet, Daglish (AU); Antonio Cantoni, City Beach (AU); Zigmantas Leonas Budrikis, Dalkeith (AU)

(73) Assignee: OPSX Developments 5 Pty Ltd., West Perth (AU)

Reexamination Request:
No. 90/008,233, Sep. 22, 2006

Reexamination Certificate for:
Patent No.: 5,689,499
Issued: Nov. 18, 1997
Appl. No.: 08/500,844
Filed: Aug. 4, 1995

(22) PCT Filed: Mar. 28, 1994
(86) PCT No.: PCT/AU94/00150
§ 371 (c)(1),
(2), (4) Date: Aug. 4, 1995
(87) PCT Pub. No.: WO94/23517
PCT Pub. Date: Oct. 13, 1994

(30) Foreign Application Priority Data

Mar. 26, 1993 (AU) ............................................. PL7981

(51) Int. Cl.
*H04Q 11/04* (2006.01)
*H04L 12/56* (2006.01)

(52) U.S. Cl. ....................................... 370/235; 370/397
(58) Field of Classification Search .................. 370/399, 370/397, 235, 237, 230, 412, 415
See application file for complete search history.

(56) References Cited

U.S. PATENT DOCUMENTS 4,769,811 A 9/1988 Eckberg, Jr. et al.
(Continued)

FOREIGN PATENT DOCUMENTS

AU PL7981 3/1993
(Continued)

OTHER PUBLICATIONS

Addie, R.G. et al., *A Gaussian Traffic Model for Statistical Multiplexers*, Australian Broadband Switching and Services Symposium, Monash University, Melbourne, Australia, Proceedings, vol. 3. Jul. 17, 1992. p. 513–522.
(Continued)

*Primary Examiner*—Anjan K. Deb

(57) ABSTRACT

An apparatus and method are provided for supporting a plurality of virtual channel (VC) connections within a single virtual path (VP) in a digital communications network operating in the Asynchronous Transfer Mode (ATM). The apparatus (56) is combined with the cross-connected part of a conventional VC switch (54) to form a Data Switch (40). A VP switch (42) switches and terminates incoming bandwidth-resourced VPs on lines (48), some of which are carrying non-bandwidth-resourced VCs and switched onto lines 50 on the output side of VP switch 42. VPs on lines (50) are switched and multiplexed by the Data Switch (40). Buffers (66) store cells and a VP rate server. The buffers (66) are significantly larger than in a conventional VC switch to enable smoothing of data flow peaks associated with data flowing from multiple bandwidth resourced VP tributaries into single resourced VP tributaries. Despite the large buffers in the Data Switch (40) congestion may result when data bursts occur on several converging streams. When buffer overflow is threatened, Data Switch (40) discards whole frames, i.e., whole VPI-VCI sequences marked with an end of transmission delimiter in the PTI, rather than individual cells originating from different frames as with normal ATM cell multiplexing.

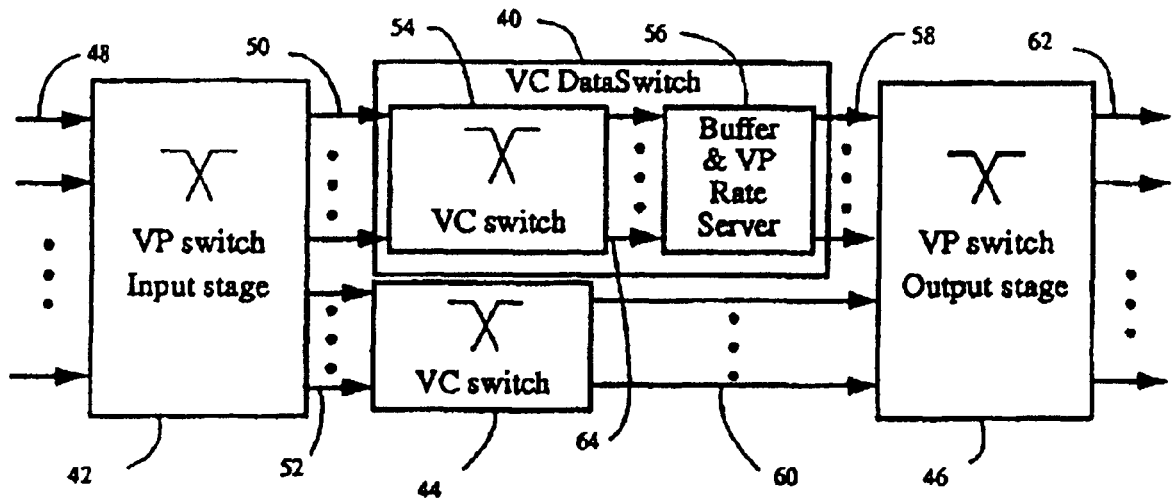

U.S. PATENT DOCUMENTS

| | | | |
|---|---|---|---|
| 4,799,215 A | 1/1989 | Suzuki |
| 4,884,263 A | 11/1989 | Suzuki |
| 5,050,166 A | 9/1991 | Cantoni et al. |
| 5,062,106 A | 10/1991 | Yamazaki et al. |
| 5,079,762 A | 1/1992 | Tanabe |
| 5,173,897 A | 12/1992 | Schrodi et al. |
| 5,179,556 A | 1/1993 | Turner |
| 5,237,563 A | 8/1993 | McNulty |
| 5,237,564 A | 8/1993 | Lespagnol et al. |
| 5,249,178 A | 9/1993 | Kurano et al. |
| 5,260,935 A | 11/1993 | Turner |
| 5,280,483 A | 1/1994 | Kamoi et al. |
| 5,282,203 A | 1/1994 | Oouchi |
| 5,287,349 A | 2/1994 | Hyodo et al. |
| 5,287,535 A | 2/1994 | Sakagawa et al. |
| 5,301,193 A | 4/1994 | Toyofuku et al. |
| 5,303,302 A | 4/1994 | Burrows |
| 5,311,513 A | 5/1994 | Ahmadi et al. |
| 5,313,454 A | 5/1994 | Bustini et al. |
| 5,315,587 A | 5/1994 | Kullander |
| 5,319,638 A | 6/1994 | Lin |
| 5,327,421 A | 7/1994 | Hiller et al. |
| 5,335,222 A | 8/1994 | Kamoi et al. |
| 5,341,373 A | 8/1994 | Ishibashi et al. |
| 5,345,445 A | 9/1994 | Hiller et al. |
| 5,345,446 A | 9/1994 | Hiller et al. |
| 5,357,510 A | 10/1994 | Norizuki et al. |
| 5,361,255 A | 11/1994 | Diaz et al. |
| 5,365,524 A | 11/1994 | Hiller et al. |
| 5,373,504 A | 12/1994 | Tanaka et al. |
| 5,404,354 A | 4/1995 | Hayter et al. |
| 5,414,707 A | 5/1995 | Johnston et al. |
| 5,426,640 A | 6/1995 | Hluchyj et al. |
| 5,528,763 A | 6/1996 | Serpanos |
| 5,555,264 A | 9/1996 | Sallberg et al. |
| 5,689,499 A | 11/1997 | Hullett et al. |
| 5,696,764 A | 12/1997 | Soumiya et al. |
| 5,768,258 A | 6/1998 | Van As et al. |

FOREIGN PATENT DOCUMENTS

| | | |
|---|---|---|
| AU | 41300/93 | 12/1993 |
| EP | 0526140 A2 | 7/1992 |
| EP | 0548995 | 6/1993 |
| EP | 0552121 | 7/1993 |
| GB | 272612 | 6/1927 |
| GB | 526104 | 9/1940 |
| GB | 2272612 | 5/1994 |
| JP | 6-244855 | 9/1994 |
| WO | WO-92/19060 | 10/1992 |
| WO | WO-93/19551 | 9/1993 |

OTHER PUBLICATIONS

Addie, R.G. et al., *Analysis of Connection Admission Control and Multiplexing Gain in a B–ISDN based on a Guassian Traffic Model*, Australian Broadband Switching and Services Symposium, Wollongong, Australia. Proceedings, vol. 1. Jul. 12–14, 1993. p. 1–8.

Armitage, G. et al., *Some Observations on the ATM Adaptation Layer Services Needed to Support TCP/IP*, Australian Broadband Switching and Services Symposium, Monash University, Melbourne, Australia. Proceedings, vol. 2. Jul. 16, 1992. p. 383–390.

Arnold, J. *Transport of Entertainment Video Services on the Broadband ISDN*, Australian Broadband Switching and Services Symposium, Monash University, Melbourne, Australia, Proceedings, vol. 3. Jul. 17, 1992. p. 594–556.

Atkinson et al., *Virtual Private Networks and Virtual Path Merging*, Australian Broadband Switching and Serices Symposium, Monash University, Melbourne, Australia. Proceedings, vol. 1, Jul. 15, 1992. p. 101–108.

Aylott, N. *Controlling Multipoint Connections in the B–ISDN*, Australian Broadband Switching and Services Symposium, Monash University, Melbourne, Australia. Proceedings, vol. 1. Jul. 15, 1992. p. 255–262.

Bae & Suda, *Survey of Traffic Control Protocols in ATM Networks*, 1990. p. 1–9.

Bhargava, A., Hluchyj, M.G., *Frame Losses Due to Buffer Overflows in Fast Packet Networks*, 1990 p. 132–139.

Burgin, I., *Traffic Control and Resource Management for the B–ISDN*, Australian Broadband Switching and Services Symposium, Monash University, Melbourne, Australian. Proceedings, vol. 1. Jul. 15, 1992. p. 93–100.

Butler, M., et al., *Adaptive Congestion Avoidance Procedures for Intelligent Network Services*, Australian Broadband Switching and Services Symposium, Wollongong, Australia. Proceedings, vol. 1. Jul. 12–14, 1993. p. 62–70.

Cell–Relay.com, *Online Access to Adaptation Layer Documentation*, 1992. p. 1–3.

Cell–Relay.com, *QPSX Announcement*, 1993. p. 1–3.

Chan, M.H. et al., *Optimal Prioritised Encoding of Statistically Multiplexed Real–time Sources in Packets Networks*, Australian Broadband Switching and Services Symposium, Monash University, Melbourne, Australia. Proceedings, vol. 3. Jul. 17, 1992. p. 621–628.

Chan, S., *Fast Reactive Congestion Control for ATM Networks*, Australian Broadband Switching and Services Symposium, Wollongong, Australia. Proceedings, vol. 1. Jul. 12–14, 1993. p. 71–78.

Chlebus, E. et al., *Mean–Value Analysis for Examining Call Admission Control Thresholds in Multi–Service Networks*, Australian Broadband Switching and Services Symposium, Wollongong, Australia. Proceedings, vol. 1, Jul. 12–14, 1993. p. 242–251.

Cidon, Israel, *Analysis of Packet Loss Processes in High–speed Networks*, 1991. p. 1–23.

Cidon, Khamisy & Sidi, *On Packet Loss Processes in High–speed Networks*, 1992. p. 0242–0251.

De Schoenmacker & Verbeeck, "*RATT: a glimpse of a broadband future*", Electronics and Communication Engineering Journal, Aug. 1992. p. 225–234.

Dunstan, S., *ATM Network Adaptation and Layered Video*, Australian Broadband Switching and Services Symposium, Monash University, Melbourne, Australia. Proceedings, vol. 2. Jul. 16, 1992. p. 375–382.

Duong, N. et al., *An Experimental Comparison Study of Variable Bit Rate versus Constant Bit Rate Video Transmission for TV Source Material*, Australian Broadband Switching and Services Symposium, Monash Univeristy, Melbourne, Australia. Proceedings, vol. 3. Jul. 17, 1992. p. 557–564.

Dutkiewicz, E. et al., *Fast Resource Management Architecture for International Networks*, Australian Broadband Switching and Services Symposium, Monash University, Melbourne, Australia. Proceedings, vol. 1. Jul. 15, 1992. p. 169–176.

Dutkiewicz, E. et al, *Investigation of Optimal Function Distribution in Switching Systems*, Australian Broadband Switching and Services Symposium, Wollongong, Australia. Proceedings, vol. 1. Jul. 12–14, 1993. p. 215–224.

Eyers, T. et al., *Monitoring Error Performance of B–ISDN Signaling Links*, Australian Broadband Switching and Services Symposium, Monash University, Melbourne, Australia. Proceedings, vol. 1. Jul. 15, 1992. p. 263–270.

Fisher, S.G. et al., *Access delay characteristics of extended distributed queueing for ATM access networks*. Thesis, Curtin University of Technology, Feb. 1996.

Follett, D. et al., *Service and Traffic Management in Global ATM Networks*, Australian Broadband Switching and Services Symposium, Wollongong, Australia. Proceedings, vol. 1. Jul. 12–14, 1993. p. 17–22.

Frater, M.R. et al., *Modeling of Variable Bit Rate Video Traffic in the Broadband ISDN*, Australian Broadband Switching and Services Symposium, Wollongong, Australia. Proceedings, vol. 1. Jul. 12–14, 1993. p. 252–259.

Gersht et al, *A congestion control framework for ATM networks*, IEEE Journal on Selected Areas In Communication vol. 9(7). Sep. 1991. pp. 1119–1130.

Greenberg, A. G. and Madras, N., *How Fair is Fair Queuing?*, Journal of the Association for Computing Machinery, vol. 39(3). Jul. 1992. p. 568–598.

Habib & Saadawi, *Controlling Flow and Avoiding Congestion in Broadband Networks*, IEEE Communications Magazine, Oct. 1991, p. 46–53.

Habibi, D. et al., *Queues with Periodic Input and Output Rates*, Australian Broadband Switching and Services Symposium, Wollongong, Australia. Proceedings, vol. 1. Jul. 12–14, 1993. p. 225–241.

Hall, R.L., *Q.93B—Evolution or Revolution?*, Australian Broadband Switching and Services Symposium, Wollongong, Australia. Proceedings, vol. 1. Jul. 12–14, 1993. p. 158–165.

Hartanto & Sirisena, *User–Network Policer: A New Approach for ATM Congestion Control*, 1993. Australian Broadband Switching and Services Symposium, Monash University, Melbourne, Australia. Proceedings, vol. 3. Jul. 17, 1992. p. 376–373.

Hartanto, F. et al., *Message Loss Study of Leaky Bucket Algorithms*, Australian Broadband Switching and Services Symposium, Wollongong, Australia. Proceedings, vol. 1. Jul. 12–14, 1993. p. 9–16.

Hartanto, V. et al., *Dissecting Call Establishment Procedures in ATM Network*, Australian Broadband Switching and Services Symposium, Monash Univeristy, Melbourne, Australia. Proceedings, vol. 3. Jul. 17, 1992. p. 605–673.

Herzberg, M., *A Linear Programming Model for Virtual Path Allocation and Management in B–ISDN*, Australian Broadband Switching and Services Symposium, Monash University, Melbourne, Australia. Proceedings, vol. 1. Jul. 15, 1992. p. 109–116.

Hong, Duke; Suda, Tatsuya, *Congestion Control and Prevention in ATM Networks*, IEEE Communications Magazine Jul. 1991. p. 10–16.

Hu, X., et al., *Dynamic Feedback Flow Control for Solving Congestion Problems in ATM Networks*, Australian Broadband Switching and Services Symposium, Wollongong, Australia. Proceedings, vol. 1. Jul. 12–14, 1993. p. 79–86.

Hughes, D. et al., *On Average Rate Prediction and Enforcement in BISDN*, Australian Broadband Switching and Services Symposium, Monash University, Melbourne, Australia. Proceedings, vol. 1. Jul. 15, 1992. p. 177–184.

Ilyas, *An Efficient Scheme for Congestion Control in Broadband ISDNs*, 1990. p. 959–963.

Ilyas & Mouftah, *Performance Evaluation of Congestion Avoidance in Broadband ISDNs*, 1990 p. 0727–0731.

Ilyas & Mouftah, *A Comparative Simulation of Congestion Avoidance Techniques in Broadband ISDNs*, 1990. p. 0584–0588.

Jain, *Congestion Control in Computer Networks—Issues and Trends*, IEEE Communications Magazine May 1990. p. 24–30.

Jakobsen, J., *Buffered Benes Networks with Bit Rate Conversion*, Australian Broadband Switching and Services Symposium, Wollongong, Australia. Prceedings, vol. 2. Jul. 12–14, 1993. p. 363–369.

Jha, S. et al., *Dynamic Performance Management in High Speed Computer Networks*, Australian Broadband Switching and Services Symposium, Wollongong, Australia. Proceedings, vol. 1. Jul. 12–14, 1993. p. 23–37.

Kanangara, C. et al., *Forward Error Control in an ATM Network*, Australian Broadband Switching and Services Symposium, Wollongong, Australia. Proceedings, vol. 1. Jul. 12–14, 1993. p. 46–52.

Kawarasaki & Jabbari, *B–ISDN Architecture and Protocol*, IEEE Journal on Selected Areas in Communications, vol. 9, No. 9, Dec. 1991, p. 1405–1415.

Kerekes, I. et al., *Efficient Transmission of Highly Burtsy Data Traffic in B–ISDN Networks*, Australian Broadband Switching and Services Symposium, Wollongong, Australia, Proceedings, vol. 2, Jul. 12–14, 1993, pp. 379–3840.

Lai, M.K.F., *Extending the A–M–S/Tucker Model to Connection Level with Precedence and Pre–emption*, Australian Broadband Switching and Services Symposium, Wollongong, Australia. Proceedings, vol. 1. Jul. 12–14, 1993, pp. 207–214.

Law, E., *Distributive Services—The Impact on Signaling in the B–ISDN*, Australian Broadband Switching and Services Symposium, Monash University, Melbourne, Australia. Proceedings, vol. 1. Jul. 15, 1992, pp. 274–354.

Lawrence, J., *Approximate Analysis of finite Queueing Networks with Customer Splitting*, Australian Broadband Switching and Services Symposium, Monash University, Melbourne, Australia. Proceedings, vol. 3. Jul. 17, 1992, pp. 539–548.

Lawrence, J. et al., *Quantifying Traffic Synchronisation in Signaling Networks*, Australian Broadband Switching and Services Symposium, Wollongong, Australia. Proceedings, vol. 1. Jul. 12–14, 1993, pp. 53–61.

Leditschke, M., *Video Codec Simulation in an ATM Environment*, Australian Broadband Switching and Services Symposium, Monash University, Mebourne, Australia. Proceedings, vol. 2. Jul. 16, 1992, pp. 439–446.

Leslie & Mcauley, *Fairisle: An ATM Network for the Local Area*, 1991, pp. 327–336.

Lim, H.H., *Interworking FASTPAC with B–ISDN*, Australian Broadband Switching and Services Symposium, Wollongong, Australia. Proceedings, vol. 2. Jul. 12–14, 1993, pp. 385–396.

Lin, Arthur Y–M, *Priority queueing strategies and buffer allocation protocols for traffic control at an ATM integrated broadband switching system*, IEEE Journal on Selected Areas in Communications, vol. 9, No. 9, Dec. 1991, pp. 1524–1536.

Liu, H., *Traffic Shaping for Congestion Control in High Speed ATM Networks*, Thesis. University of Saskatchewan; Saskatoon, Saskatchewan, Aug. 1992, Department of Computer Science, pp. 1–83.

McCanne, S.; Jacobson, V., *The BSD Packet Filter: A New Architechture for User—Level Packet Capture,*, Dec. 1992, pp. 1–11.

Mercankosk, G., *Access Delay Analysis for Extended Distributed Queueing*, Australian Broadband Switching and Services Symposium, Monash University, Melbourne, Australia. Proceedings, vol. 3. Jul. 17, 1992, pp. 597–604.

Moors, T., *Generic Flow Control Within BISDN Customer Premises Networks*, Australian Broadband Switching and Services Symposium, Wollongong, Australia. Proceedings, vol. 1. Jul. 12–14, 1993, pp. 174–181.

Moors, Tim, *Implementing Traffic Shaping*, 1994.

Moors, Tim; Cantoni, Antonio, *Positioning Routing in the Protocol Stack (or "Passing the Bus–Selection Buck")*, 1992.

Moors, Tim; Cantoni, Antonio, *Cascading Content–Addressable Memories*, 1992.

Morgan, S., *Queueing Disciplines and Passive Congestion Control in Byte–Stream Networks*, IEEE Transactions on Comminications, vol. 39, No. 7, Jul. 1991, pp. 1097–1106.

Nagle, J., *RFC 896—Congestion Control in IP—TCP Internetworks*, 1984.

Newman, P., *Backward Explicit Congestion Notification for ATM Local Area Networks*, IEEE Communications Magazines 1993. p. 719–723.

O'Neill, C., *Comparison of ATM Network Congestion Control Methods, Australian Telecommunications Research*, Australian Telecommunication Research, vol. 26(2), 1992: 31–38.

O'Neill, C., *Fairness Discarding for Congestion Control in ATM Networks*, Australian Broadband Switching and Services Symposium, Monash Univeristy, Melbourne, Australia, Proceedings. vol. 1, Jul. 15, 1992, pp. 185–192.

Pickering, M. et al., *VBR Rate Control with a Human Visual System Based Distortion Measure*, Australian Broadband Switching and Services Symposium, Wollongong, Australia. Proceedings, vol. 2. Jul. 12–14, 1993, pp. 397–404.

Pieloor, J. et al., *Accurate Source Models and a High Performance Simulator for Broadband ISDN Analysis*, Australian Broadband Switching and Services Symposium, Monash University, Melbourne, Australia. Proceedings, vol. 3. Jul. 17, 1992, pp. 523–530.

Potter, P., *A Generic Flow Control Protocol* Australian Broadband Switching and Services Symposium, Monash University, Melbourne, Australia. Proceedings, vol. 1. Jul. 15, 1992, pp. 117–128.

Princen, J., *Cell Loss Characteristics for Statistically Multiplexed Video on ATM Networks*, Australian Broadband Switching and Services Symposium, Monash University, Melbourne, Australia. Proceedings, vol. 3. Jul. 17, 1992, pp. 629–636.

Richards, A. et al., *A Case for Adaptive Protocol Implementations*, Australian Broadband Switching and Services Symposium, Wollongong, Australia. Proceedings, vol. 1. Jul. 12–14, 1993, pp. 151–157.

Rocher, E Y; Newman, R M; Budrikis, Z L; Hullett; JL, *Comments on "The QPSX man"*, 1988, ULAN Corporation, pp. 1–16.

Romanow, A., *TCP Over ATM with Congestion: Some Performance Results*, ATM Forum Contribution 93–784, Jul. 27–29, 1993.

Romanow, A.; Lyon, T., *Adaptive and Cooperative Bandwidth Management in ATM Networks*, Nov. 15, 1991; pp. 1–6.

Romanow, Allyn, *Preliminary Report of Performance Results for TCP Over ATM with Congestion*, Jul. 1993; pp. 1–6.

Romanow, Allyn; Floyd, Sally, *Packet Discard Strategies for TCP Over ATM (Presentation)*, 1993; 9 pages.

Sarkies, K., *ATM Switch Architectural Design Principles and Performance*, Australian Broadband Switching and Services Symposium, Monash University, Melbourne, Australia. Proceedings, vol. 3. Jul. 17, 1992, pp. 589–596.

Schapeler, G. et al., *ATD—Specific Network Management Function and TMN Architecture*, Electronics and Communication Engineering Journal, Oct. 1992, pp. 323–330.

Tate, D., *Type 1 ATM Adaptation Layer Implementation Issues*, Australian Broadband Switching and Services Symposium, Monash University, Melbourne, Australia. Proceedings, vol. 2. Jul. 16, 1992, pp. 391–398.

Theimer, T.H., *Modeling and Dimensioning Buffers in Multistage ATM Switch Fabrics*, Australian Broadband Switching and Services Symposium, Wollongong, Australia. Proceedings, vol. 1. Jul. 12–14, 1993, pp. 190–206.

Turner, J., *Design of Local ATM Networks*, Thesis, Washington University, Computer Science Department, St. Louis, Muissouri, pp. 1–121.

Vakill & Saito, *On Congestion Control in ATM Networks*, IEEELTS August 1991; pp. 55–65.

Waterman, M.G. et al., *Voice Traffic Control in B–ISDN*, Australian Broadband Switching and Services Symposium, Wollongong, Australia. Proceedings, vol. 1. Jul. 12–14, 1993, pp. 38–45.

Weiss & Klotsche, *Multimedia Communication*, 1993. p. 127–151.

Wong, H., *Implementation of CCITT ATM Adaptation Layers*, Australian Broadband Swicthing and Services Symposium, Wollongong, Australia. Proceedings, vol. 1. Jul. 12–14, 1993, pp. 166–173.

Woodruff, Rodgers & Richards, *A Congestion Control Framework for High–speed Integrated Packetized Transport*, 1989; pp. 0203–0207.

Woodworth, Gaglianello & Gitlin, *Congestion Control in ATM Networks*, 1991; pp. 1082–1088.

Yau, V. et al., *ATM Buffer Overflow Control: A Nested Threshold Cell Discarding with Suspended Execution*, Australian Broadband Switching and Services Symposium, Monash University, Melbourne, Australia. Proceedings, vol. 3. Jul. 17, 1992, pp. 699–716.

Yagani, *Performance Models for ATM Switching of Mixed Continuous–Bit–Rate and Bursty Traffic with Threshold–Based Discarding*, 1992; pp. 1621–1627.

Zhang, L. *Error Recovery Coding Options for Packet Video Services in ATM*, Australian Broadband Switching and Services Symposium, Monash University, Melbourne, Australia. Proceedings, vol. 2. Jul. 16, 1992, pp. 447–453.

Zhang, L. et al, *Simulation Study of Cell Loss in ATM Networks*, Australian Broadband Switching and Services Symposium, Monash University, Melbourne, Australia. Proceedings, vol. 2. Jul. 16, 1992, pp. 431–438.

Zhang, X. et al., *An Efficient Cell Loss Recovery Scheme for Videophone Image Sequences on the Broadband ISDN*, Australian Broadband Switching and Services Symposium, Monash University, Melbourne, Australia. Proceedings, vol. 2. Jul. 16, 1992, pp. 455–462.

Z.L. Budrikis. et al., *A Generic Flow Control Protocol for B–ISDN, A.T.R. vol. 26 No. 2, 1992*, Supplied by The British Library—"The world's knowledge".

Osama Aboul–Magd, et al., *Flow and Congestion Control For Broadband Packet Networks*, Teletraffic and Datatraffic in a Periof of Change, ITC–13, Elsevier Science Pub. B.V. (North–Holland) IAC, 1991.

Hamid Ahmdi et al., *Analysis of Leaky Bucket Access Control Mechanism with Batch Arrival Process,*, IBM Research Division, T.J. Watson Research Center, CH2827–04/90/0000–0344 1990 IEEE.

Grenville J. Armitage and Keith M. Adams, *Packet Reassembly During Cell Loss*, 0890–8044/921993 IEEE.

Jaime Jungok Bae, et al., *Analysis of Individual Packet Loss in a Finite Buffer Queue with Heterogeneous Markow Modulated Arrival Processes: A Study of Traffic Burstiness and Priority Packet Discarding*, INFOCOM '92.

Krishna Bala, et al., *Congestion Control for High Speed Packet Switched Networks*, CH2826–5/90/0000/0520 1990 IEEE.

Arthur W. Berger, *Overhead Control Using Rate Control Throttle: Selecting Token Bank Capacity for Robustness to Arrival Rates*, IEEE Transactions on Automatic Control, vol. 36, No. 2, Feb. 1991.

Amit Bhargava and Michael G. Hluchyj, *Frame Losses Due to Buffer Overflows in Fast Packet Networks*, CH2826–5/90/0000/0132 1990 IEEE.

Giuseppe Bianchi and Jonathan S. Turner, *Imported Queueing analysis of Shared Buffer Switching Networks*, 0743–166X/93 1993 IEEE.

C. Blondia and O. Casals, *Performance Analysis of Statistical Multiplexing of VBR Sources*, CH3133–6/92/0000–0828 IEEE, INFOCOM '92.

F. Borgonovo, et al., *Policing Procedures: Implications, Definitions and Proposals*, Teletraffic and Datatraffic in a Period of Change, ITC–13, Elsevier Science Pub. B.V. (North–Holland) © IAC, 1991.

F.M. Brochin, *A Method of Computation of the Consecutive Cell Loss Probability for an Individual Source in Superposed Traffic*, Performance of Distributed Systems and Integrated Communication Networks, Elsevier Pub. B.V. (North Holland) 1992 IFTP.

Z.L. Budrikis, et al., *Size and Speed Insensitive Distributed Queue Network*, Jul. 26, 2005.

Z.L. Budrikis, et al., *Transient–Mode Buffer Stores for Nonuniform Code TV*, IEEE Transactions on Communication Technology, vol. Com–19, No. 6, Dec. 1971.

Z.L. Budrikis, et al., *A Generic Flow Control Protocol for B–ISDN*, CH3133–6/92/0000–0895 IEEE.

Z.L. Budrikis, et al., *A New Lightpen for Raster Displays*, Computer Visions, Graphics, and Image Processing 32, 359–383 (1985).

Z.L. Budrikis, et al. *QPSX: A Queue Packet and Synchronous Circuit Exchange*, New Communication Services: A Challenge to Computer Technology, Elsevier Science Pub. B.V. (North–Holland) ICCC 1986.

Z.L. Budrikis and A.N. Netravati, *A Packet/Circuit Switch*, AT&T Bell Laboratories Technical Journal, vol. 63, No. 8, Oct. 1984.

Miletta Butto', et al., Effectiveness of the "Leaky Bucket" Policing Mechanism in ATM Networks, IEEE Journal on Selected Areas in Communications, vol. 9, No. 3, Apr. 1991.

H.J. Chao, *Design of Leaky Bucket Access Control Schemes in ATM Networks*, CH2984–3/91/0000–0180 1991 IEEE.

H.J. Chao and Donald E. Smith, *Design of Virtual Channel Queue in An ATM Broadband Terminal Adaptor*, CH3133–6/92/0000–0294 1992 IEEE.

Ming Chen, *A Services Features Oriented Congestion Control Scheme for a Broadband Network*, CH2984–3/91/0000–0105 1991 IEEE.

Lin Chuang and Li Yin, *Dynamic Partial Buffer Sharing Scheme*: Proportional Packet Loss Rate.

Israel Cidon, et al., *On Protective Buffer Policies*, IEEE/ACM Transactions on Networking, vol. 2, No. 3, Jun. 1994.

Israel Cidon, et al., *Analysis of Packet Loss Processes in High–Speed Networks*, IEEE Transactions on Information Theory, vol. 39, No. 1, Jan. 1993.

Nathan Clarke, et al., *ATM Switching Tables*, Telecommunications Networks & Applications Conference, Melbourne Dec. 5–7, 1994.

J.R. Cox, et al., *A Demonstration of Medical Communications Based on an ATM Broadband Network Technology*, SPIE vol. 1654, Medical Imaging VI: PACS Design and Evaluation (1992).

L. Dittmann, et al., *Flow Enforcement Algorithms for ATM Networks*, IEEE Journal on Selected Areas in Communications, vol. 9, No. 3, Apr. 1991.

A.E. Eckberg, et al., Bandwidth Management: *A Congestion Control Strategy for Broadband Packet Networks—Characterizing the Throughput–bustiness Filter*, Elsevier Science Pub. B.V. (North–Holland), Computer Networks and ISDN Systems 20 (1990).

A.E. Eckberg, Jr. et al., *Meeting the Challenge: Congestion and Flow Control Strategies for Broadband Information Transport*, CH2682–3/89/0000–1769 1989 IEEE.

J. Escobar, *Future Challenges for the Adaptation Layer*, 0140–3664/93/020077–06 1993 Butterworth–Heinemann Ltd.

S. Floyd, *Connections with Multiple Congested Gateways in Packet–Switched Networks, Part 2: Two–way Traffic*, Dec. 13, 1991.

A. Gersht, et al., *A Congestion Control Framework for ATM Networks*, CH2702–9–89/0000/070 1989 IEEE.

S.J. Golestani, *Congestion–Free Transmission of Real–Time Traffic in Packet Networks*, CH2826–5/90/0000/0527 1990 IEEE.

S.J. Golestani, *A Framing Strategy for Congestion Management*, IEEE Journal on Selected Areas in Communications, vol. 9, No. 7, Sep. 1991.

Z. Haas, et al., *Congestion Control by Adaptive Admission*, CH2979–3/91/0000–0560, 1991 IEEE.

Anna Haċ, *Congestion Control and Switch Buffer Allocation in High–Speed Networks*, CH2979–3/91/0000–0314, 1991 IEEE.

E.E. Hahne, et al., *Fairness and Congestion Control on a Large ATM Data Network with Dynamically Adjustable Windows*, Telereffic and Datatraffic in a Period of Change, ITC–13, Elsevier Science Pub. B.V. (North–Holland) IAC, 1991.

D.P. Heyman, *A Performance Model of the Credit Manager Algorithm*, 0169–7552/92 1992—Elsevier Science Pub. B.V.

M. Hirang, Traffic Characteristics amd a Congestion Control Scheme for an ATM Network, Int'l Journal of Digital & Analog Comm. Systems, vol. 3, 211–237 (1990).

M. Hirano, et al., *Traffic Characteristics and a Congestion Control Scheme for an ATM Network*, International Journal of Digital and Analog Communication Systems, vol. 3, 211–217 (1990).

D. Hong, et al., *Survey of Techniques for Prevention and Control of Congestion in an ATM Network*, CH2984–3/91/0000–0204 1991 IEEE.

R.M. Howard, et al., *On the noise of high–transimpedance amplifiers for long–wavelength pulse OTDRs*, 0306–8919/87 1987 Chapman and Hall Ltd.

D.A. Hughes, et al., *Congestion Control in an ATM Network*, Teletraffic and Datatraffic in a Period of Change, ITC–13, Elsevier Science Pub. B.V. (North–Holland) IAC, 1991.

J.L. Hullett, *B_ISDN and the Evolution of Man*, 0–7803–0849–2/92 1992 IEEE.

J.L. Hullett, *New proposal extends the reach of metro area nets*, Data Communications, Feb. 1988.

Van Jacobson, *Congestion Avoidance and Control*, 1988 ACM 0–89791–279–9/88/008/0314.

Raj Jain, *Congestion Control and Traffic Management ATM Networks: Recent Advances and A Survey*, Congestion Control and Traffic Management in ATM Networks, p. 1 of 21, Jul. 25, 2005.

A. Jalali and L.G. Mason, *Open Loop Schemes for Networkk Congestion Control*, CH2984–3/91/0000–0199, 1991 IEEE.

C.A. Kent, et al., *Fragmentation Considered Harmful*, originally published in Proc. SIGCOMM '87, vol. 17. No. 5, Oct. 19, 1987.

J.F.C. Kingman, *The Effect of Queue Dicipline on Waiting Time Variance*, Received Mar. 8, 1961, Research Notes, Supplied by The British Library—"The world's knowledge".

Hans Kröner, et al., *Priority Management in ATM Switching Nodes*, IEEE Journal on Selected Areas in Communications, vol. 9, No. 3, Apr. 1991.

Duan–Shin Lee and Bhaskar Sengupta, Queueing Analysis of a Threshold Based Priority Scheme for ATM Networks, IEEE/ACM Transactions on Networking, vol. 1, No. 6, Dec. 1993.

Will E. Leland, *Window–Based Congestion Management in Broadband ATM Networks: The Performance of Three Access–Control Policies*, CH2682–3/89/0000–1794 1989 IEEE.

Y.–M. Lin and John A. Silvester, *Priority Queueing Strategies and Buffer Allocation Protocols for Traffic Control at an ATM Integrated Broadband Switching System*, IEEE Journal on Selected Areas in Communications, vol. 9, No. 9, Dec. 1991.

Kunyan Liu, et al., *Design and Analysis of a Bandwidth Management Framework for ATM–Based Broadband ISDN*, abbreviated version of paper presented at IEEE International Conference on Communications, 1996.

G. Mercankosk, et al., *DQDB for Time Constrained Services*, High Performance Networking, IV (C–14), Elsevier Science Pub. B.V. (North–Holland) © 1993 IFIP.

G. Mercankosk, et al., *Extended Distributed Queueing for Integrated Services*, IEEE Journal on Selected Areas in Communications, vol. 11, No. 8, Oct. 1993.

G. Mercankosk, et al., *Characterization of a CBR Connection over a Channel with Known Bounded Delay Variation*, 0743–166X/93, 1993 IEEE.

Debasis Mitra, *Optional Design of Windows for High Speed Data Networks*, CH2826–5/90/0000/1156, 1990 IEEE.

Tim Moors and Antonio Cantoni, *ATM Receiver Implementation Issues*, IEEE Journal on Selected Areas in Communications, vol. 11, No. 2, Feb. 1993.

Mehdi Nassehi, *Window Flow Control in Frame–Relay Networks*, CH2535–3/88/0000–1784, 1988 IEEE.

A.N. Netravali and Z.L. B udrikis, *A Broadband Local Area Network*, AT&T Technical Journal, vol. 64, No. 10, Dec. 1985.

R.M. Newman, et al., *The QPSX Man*, 0163–6804/88/0004–0020, 1988 IEEE.

Hiroshi Ohta and Tokuhiro Itami, *A Cell Loss Recovery Method Using FEC in ATM Networks*, 0733–8716/91, 1991 IEEE.

C.J. O'Neill, *Comparison of Broadband ISDN Congestion Control Methods*, Australian Broadband Switching and Services Symposium '91, vol. 1: Sydney Jul. 3–5, 1991.

David W. Petr and Victor S. Frost, *Nested Threshold Cell Discarding for ATM Overload Control: Optimization Inder Cell Loss Constraints*, CH2979–3/91/0000–1303, 1991 IEEE.

David W. Petr and Victor S. Frost, *Optimal Packet Discarding: An ATM–Oriented Analysis Model and Initial Results*, CH2826–5/90/0000/0537, 1990 IEEE.

Philip G. Potter and Moshe Zukerman, *Analysis of a Discrete Multipriority Queueing System Involving a Central Shared Processor Serving Many Local Queues*, IEEE Journal on Selected Areas in Communications, vol. 9. No. 2, Feb. 1991.

Gopalakrishnan Ramamurthy and Rajiv S. Dighe, A Multidimensional Framework for Congestion Control in B–ISDN, IEEE Journal on Selected Areas in Communications, vol. 9, No. 9, Dec. 1991.

K.K. Ramakrishnan and Raj Jain, *A Binary Feedback Scheme for Congestion Avoidance in Computer Networks*, ACM Transactions on Computer Systems, vol. 8, No. 2, May 1990, pp. 158–181.

Erwin P. Rathgeb, *Modeling and Performance Comparison of Policing Mechanisms for ATM Networks*, IEEE Journal on Selected Areas in Communications, vol. 9, No. 3, Apr. 1991.

James W. Roberts and Jorma T. Virtamo, *The Superposition of Periodic Cell Arrival Streams in an ATM Multiplexer*, IEE Transactions on Communications, vol. 39, No. 2, Feb. 1991.

Letter to the Editor, Nov. 1988, IEEE Communications Magazine.

Allyn Romanow and Sally Flyod, *Dynamics of TCP Traffic over ATM Networks*, SIGCOMM 94–8/94 London England UK 1994 ACM 0–89791–682–4/94/0008.

Allyn Romanow and Sally Floyd, *Dynamics of TCP Traffic over ATM Networks*, IEEE Journal on Selected Areas in Communications, May 1995.

Allyn Romanow and Sally Flyod, *Dynamics of TCP Traffic over ATM Networks*, IEEE Journal on Selected Areas in Communications, vol. 13, No. 4, May 1995.

Allyn Romanow, *Packet Discard Strategies for Controlling ATM Congestion*, Traffic Management Sub–Working Group, Jan. 17–20, 1994.

Allyn Romanow and Rasoul Oskouy, *A Performance Enhancement for Packetized ABR and VBR+ Data*, Traffic Management Sub–Working Group, Mar. 21–25, 1994.

Allyn Romanow, *TCP over ATM: Some Performance Results*, Traffic Management Sub–Working Group, Jul. 27–29, 1993.

Sabouri Thierry, *Overload Control in a Distributed System*, Teletraffic and Datatraffic in a Period of Change, ITC–13, Elsevier Science Pub. B.V. (North–Holland) IAC, 1991.

Henning Schulzrinne, et al., *Congestion Control for Real–Time Traffic in High–Speed Networks*, CH2826–5/90/0000/0543, 1990 IEEE.

Hiroshi Shimizu, et al., *Packet Communication Protocol for Image Services on a High–Speed Multimedia LAN*, IEEE Journal on Selected Areas in Communications, vol. 7, No. 5, Jun. 1989.

Moshe Sidi, et al., *Congestion Control Through Input Rate Regulation*, CH2682–3/89/0000–1764, 1989 IEEE.

Leandros Tassiulas, et al., *Optimal Buffer Control During Congestion in an ATM Network Node*, IEEE/ACM Transactions on Networking, vol. 2, No. 4, Aug. 1994.

Jonathan S. Turner, *New Directions in Communications (or Which Way to the Information Age?)*, IEEE Communications Magazine, Oct. 1986—vol. 24, No. 10.

Jonathan S. Turner, *Queueing Analysis of Buffered Switching Networks*, IEEE Transactions on Communications, vol. 41, No. 2, Feb. 1993.

Ame Jensen and V.B. Iversen, *Teletraffic and Datatraffic in a Period of Change ITC–13*, Proceedings of the Thirteenth International Teletraffic Congress Copenhagen, Denmark, Jun. 19–26, 1991.

Erich Unteregelsbacher and H.T. Mouftah, *PDF Based Congestion Control in ATM Networks*, CH2984–3/91/0000–0211, IEEE.

Shunji Abe and Toshio Soumiya, *A Traffic Control Method for Service Quality Assurance in an ATM Network* IEEE Journal on Selected Areas in Communications, vol. 12, No. 2, Feb. 1994.

Jul. 7, 1993 Email from Iwe@isi.edu to A. Romanow@Eng re TCP over ATM.

Randall J. Atkinson, *Default IP MTU for use over ATM AAL5*, Network Working Group, Naval Research Laboratory, Nov. 16, 1993.

Randall J. Atkinson, *Default IP MTU for user over ATM AAL5*, Network Working Group, Naval Research Laboratory, Jan. 14, 1994.

G.S. Blair, et al., *Summary of the 4th International Workshop on Network and Operating System Support for Digital Audio and Video (NOSSDAV'93)*, Computer Communication Review, 1993.

Stephanie M. Boyles, et al., *Common Channel Signaling: The Nexus of an Advanced Communications Network*, IEEE Communications Magazine, Jul. 1990.

John Burgin and Dennis Dorman, *Broadband ISDN Resource Management: The Rose of Virtual Paths*, IEEE Communications Magazine, Sep. 1991.

Maurizio Casoni, *Early Packet Discard with Diverse Management Policies for EOM Cells*, 0–7803–4443–X/97, 1997 IEEE.

Jonathan S. Turner, et al., *On Performance of Early Packet Discard*, IEEE Journal on Selected Areas in Communications, vol. 15, No. 5, Jun. 1997.

Israel Cidon, et al., *Bandwidth Management and Congestion Control in plaNET*, IEEE Communications Magazine, Oct. 1991.

C. Anthony Cooper and Kun I. Park, *Toward a Broadband Congestion Control Strategy*, IEEE Network Magazine, May 1990.

M. Decina, et al., *Bandwidth Allocation and Selective Discarding for Variable Bit Rate Video and Bursty Data Calls in ATM Network*, CH2979–3/91/0000–1386, 1991 IEEE.

Adrian E. Eckberg, et al., *Controlling Congestion in B–ISDN/A Issue and Strategies*, IEEE Communications Magazine, Sep. 1991.

Henry J. Fowler and Will E. Leland, *Local Area Network Traffic Characteristics, with Implications for Broadband Network Congestion Management*, IEEE Journal on Selected Areas in Communications, vol. 9, No. 7, Sep. 1991.

Mark W. Garrett and Martin Vetterli, *Joint Source /Channel Coding of Statistically Multiplexed Real–Time Services on Packet Network*, IEEE/ACM Transactions on Networking, vol. 1, No. 1, Feb. 1993.

Henry Gilbert, et al., *Developing a Cohesive Traffic Management Strategy for ATM Networks*, IEEE Communications Magazine, Oct. 1991.

David J. Goodman, *Trends in Cellular and Cordless Communications*, IEEE Communications Magazine, Jun. 1991.

David J. Goodman, et al., *Network Control for Wireless Communications*, IEEE Communications Magazine, Dec. 1992.

Ibrahim W. Habib and Tarek N. Saadawi, *Multimedia Traffic Characteristics in Broadband Networks*, IEEE Communications Magazine, Jul. 1992.

Yong–Hee Jeon and Ioannis Viniotis, *Priority Service Disciplines and Voice Cell Discarding Schemes in ATM Networks*, 07803–0494–2/92, 1992 IEEE.

Ahmed E. Kamal, *Performance Modeling of Partial Packet Discarding Using the End–of–Packet Indicator in AAL Type 5*, IEE/ACM Transactions on Networking, vol. 4, No. 6, Dec. 1996.

Farouk Kamoun, *A Drop and Throttle Flow Control Policy for Computer Networks*, IEEE Transactions on Communications, vol. Com–29, No. 4, Apr. 1981.

Jaidev Kaniyil, et al., *Input Buffer Limiting: Behavior Analysi of a Node Throughout the Range of Blocking Probabilities*, IEEE Transactions on Communications, vol. 39, No. 12, Dec. 1991.

Mark J. Karol, et al., *Input Versus Output Queueing on a Space–Division Packet Switch*, IEEE Transactions on Communications, vol. Com–35, No. 12, Dec. 1987.

Yonghwan Kim and San–qi Li, *Performance Analysis of Data Packet Discarding in ATM Networks*, IEEE/ACM Transactions on Networking, vol. 7, No. 2, Apr. 1999.

Byung G. Kim and Don towsley, *Dynamic Flow control Protocols for Packet–Switching Multiplexers Serving Real–Time Multipacket Messages*, IEEE Transactions on Communications, vol. Com.–34, No. 4, Apr. 1986.

Aurel A. Lazar and Giovanni Pacifici, *Control of Resources in Broadband Networks with Quality of Service Guarantees*, IEEE Communications Magazine, Oct. 1991.

Christopher Lefelhoez, et al., *Congestion Control for Best–Effort Service: Why We Need a New Program Paradigm*, IEEE Network, Jan./Feb. 1996.

San–Qi Li, *Overload Control in a Finite Message Storage Buffer*, IEEE Transactions on Communications, vol. 37, No. 12, Dec. 1989.

J. Bryan Lyles and Daniel C. Swinehart, *The Emerging Gigabit Environment and the Role of Local ATM*, IEEE Communications Magazine, Apr. 1992.

R. Scott Mckinney and Travis H. Gordon, *ATM for Narrowband Services*, IEEE Communications Magazine, Apr. 1994.

Peter Newman, *ATM Technology for Corporate Networks*, IEEE Communications Magazine, Apr. 1992.

Peter Newman, *ATM Local Area Networks*, IEEE Communications Magazine, Mar. 1994.

David W. Petr, et al., *Priority Discarding of Speech in Integrated Packet Networks*, IEEE Journal on Selected Areas in Communications, vol. 7, No. 5, Jun. 1989.

P. Venkat Rangan, *Research Contributions of the UCSD Multimedia Laboratory*, Jan. 25, 1994.

P. Venkat Rangan, et al., *Designing an On–Demand Multimedia Service*, IEE Communications Magazines, vol. 30, No. 7, Jul. 1992, pp. 56–65.

Ian M. Ross, *Wireless Network Directions*, IEEE Communications Magazine, Feb. 1991.

Hiroshi Saito, *Optimal Queueing Discipline for Real–Time Traffic at ATM Switching Nodes*, IEEE Transactions on Communications, vol. 38, No. 12, Dec. 1990.

Moshe Sidi, et al., *Congestion Control Through Input Rate Regulation*, IEEE Transactions on Communications, vol. 41, No. 3, Mar. 1993.

Kotikalapudi Sriram and David M. Lucantoni, *Traffic Smoothing Effects of Bit Dropping in a Packet Voice Multiplexer*, IEEE Transactions on Communications, vol. 37, No. 7, Jul. 1989.

Gillian M. Woodruff and Rungroj Kositpaiboon, *Multimedia Traffic Management Priciples for Guaranteed ATM Network Performance*, IEEE Journal on Selected Areas in Communications, vol. 8, No. 3, Apr. 1990.

V. Yau and K. Pawlikowski, *Improved Nested–Threshold–Cell–Discard Buffer Management Mechanisms*, IEEE Region 10 Conference, Tencon 92, $11^{th}$–$13^{th}$ Nov. 1992.

Setiadi Yazid and H.T. Mouftah, *Congestion Control Methods for BISDN*, IEEE Communications Magazine, Jul. 1992.

Nanying Yin and Michale G. Hluchyj, *Implication of Dropping Packets from the Front of a Queue*, IEEE Transactions on Communications, vol. 41, No. 6, Jun. 1993.

Nanying Yin, et al., *Congestion Control for Packet Voice by Selective Packet Discarding*, IEEE Transactions on Communications, vol. 38, No. 5, May 1990.

Telecom, *Proceedings of the Australian Broadband Switching and Services Symposium 1993*, Jul. 12–14, 1993.

Eman Salaheddin Hashem, *Analysis of Random Drop for Gateway Congestion Control*, 1989.

John Hullett, et al., *Packet Discard Strategy for Congestion Control of ATM Data Networks*, Australian Telecommuncation Networks & Applications Conference, Dec. 5–7, 1994.

Guven Mercankosk and Zigmantas Budrikis, *Spacing and Multiplexing in ATM Networks*, Australian Telecommunication Networks & Applications Conference, Dec. 5–7, 1994.

River Murray, *Proceedings of the Seventh Australian Teletraffic Research Seminar*, Nov. 15–17, 1992.

Royal Melbourne Institute of Technology, Proceedings of the Eighth Australian Teletraffic Research Seminar, Dec. 6–8, 1993.

Australian Telecommunication Networks & Applications Conference 1994, Meeting User Needs, vol. 2, Dec. 5–7, 1994, Proceedings Dec. 7, 1994.

Su–Yeon Kim, Experience with an XTP Implementation on Windows NT, Electronics Telecommunications Research Institute, Korea, Dec. 5–7, 1994.

Australian Telecommunication Networks & Applications Conference 1994, Meeting User Needs, vol. 1, Dec. 5–7, 1994, Proceedings 5 & 6 Dec. 1994.

Telecom Australia Research Laboratories, Australian Broadband Switching and Services Symposium '92, "Looking into The Future", Jul. 14–17, 1992, vol. 2, Proceedings Jul. 15, 1992.

Telecom Australia Research Laboratories, Australian Broadband Switching and Services Symposium '92, "Looking into The Future", Jul. 14–17, 1992, vol. 2, Proceedings Jul. 16, 1992.

Telecom Australia Research Laboratories, Australian Broadband Switching and Services Symposium '92, "Looking into The Future", Jul. 14–17, 1992, vol. 3, Proceedings Jul. 17, 1992.

Telecom, Proceedings of the Australian Broadband Switching and Services Symposium 1993, University of Wollongong, ABSSS '93 vol. 2, Jul. 12–14, 1993.

Armitage, et al., Transient Neighbors for IPv6 Over ATM, Mar. 20, 1997.

ATM User–Network Specification, Version 3.0, 1993 The ATM Forum, Sep. 10, 1993.

Australian Telecommunication Research, Contents, vol. 26, No. 1, 1992.

Australian Telecommunication Research, Contents, vol. 26, No. 2, 1992.

Australian Telecommunication Research, Contents, vol. 27, No. 1, 1993.

Australian Telecommunication Research, Contents, vol. 27, No. 2, 1993.

Australian Telecommunication Research, Contents, vol. 28, No. 1, 1994.

Australian Telecommunication Research, Contents, vol. 28, No. 2, 1994.

Giuseppe Bianchi, et al., Approved Queueing Analysis of Shared Buffer Switching Networks, IEEE/ACM Transactions on Networking, vol. 1, No. 4, Aug. 1993.

Allen R. Bonde, Jr., et al., A Comparative Study of Fuzzy Versus "Fixed" Threshold for Robust Queue Management in Cell–Switching Networks, IEEE/ACM Transactions on Networking, vol. 2, No. 4, Aug. 1994.

Donald F. Box, et al., Architecture and Design of Connectionless Data Service for a Public ATM Network, Department of Information and Computer Science, University of California, Irvine, 1993.

V.A. Bolotin et al., International Teletraffic Congress, Seventh Specialist Seminar, AT&T Bell Laboratories , et al., Oct. 1990.

Carl, Packet Discard Strategies, Cell Relay Archive, Apr. 30, 1994.

Carl Hornberg, Packet Discard Strategies, Cell Replay Archive, May 1, 1994.

Jim Breen, Packet Discard Strategies, Cell Relay Archive, May 1, 1994.

Chris O'Neill, Packet Discard Strategies, Cell Relay Archive, May 1, 1994.

Jim Breen, Packet Discard Strategies, Cell Relay Archive, May 8, 1994.

Jim Breen, Packet Discard Strategies, Cell Relay Archive, May 9, 1994.

Tom Chaney, et al., Design of a Gigabit ATM Switch, Washington University, St. Louis, 1997.

Sydney Hilton, Getting It All Together, Communications Technology, Services and Systems, Oct. 20–22, 1992.

David M. Drury, ATM traffic management and the impact of ATM switch design, Computer Networks and ISDN Systems 28, (1996).

Adrian E. Eckberg et al., Controlling Congestion in B–ISDN/ATM: Issues and Strategies, IEEE Communications Magazine, Sep. 1991.

European Patent Application, Dec. 29, 1993.

Chien Fang, et al., Simulation Analysis of TCP Performance in Congested ATM LAN using DEC's Flow Control Scheme and two Selective Cell–drop Schemes, Traffic Management Subworking Group, Jan. 17, 1994.

S. FDIDA Laboratoire MASI–CNRS, High Performance Networking, V, N–H, 1994.

M. Decina, European Transaction on Telecommunication and related technologies, Eurel Publication, Mar.–Apr. 1992.

E.L. Hahne, et al., Dynamic window flow control on a high–speed wide–area data network, Computer Networks and ISDN Systems 26 (1993).

Hiroshi INAI, Block of Cells Discarding for Congestion Control in ATM Networks, Dept. Communcation Engineering Okayama Prefectural University, 1994 IEEE.

Michael G. Hluchyj, Queueing in High–Performance Packet Switching, IEEE Journal on Selected Areas in Communications, vol. 6, No. 9, Dec. 1988.

Michael G. Hluchyj, On the Queueing Behavior of Multiplexed Leaky Bucket Regulated Sources, 1993 IEEE.

Israel Cidon, Analysis of one–way reservation algorithms, Journal of High Speed Networks 5 (1996).

Distributed Queue Dual Bus (DQDB) Subnetwork of a Metropolitan Area Network (MAN), 1990 IEEE.

IEEE INFOCOM '91, The Conference on Computer Communications, Proceedings vol. 1, Networking in the 90s, Tenth Annual Joint Conference of the IEEE Computer and Communications Societies, Tutorials Apr. 7–8, 1991, Technical Sessions Apr. 9–11, 1991.

Jonathan S. Turner, Managing Bandwidth in ATM Networks with Bursty Traffic, IEEE Network, Sep. 1992.

Seyyed M–R Mahdavian, Resource Management and Bandwidth Allocation in ATM Networks, Washington University Sever Institute of Technology, Dec. 1994.

Jonathan S. Turner, Queueing Analysis of Buffered Switching Networks, IEEE Transactions on Communications, vol. 41, No. 2, Feb. 1993.

Manolis G. H. Katevenis, Fast Switching and Fair Control of Congested Flow in Broadband Networks, IEEE Journal on Selected Areas in Communications, vol. SAC–5, No. 8, Oct. 1987.

H.T. Kung, et al., Credit–based Flow Control for ATM Networks: Credit Update Protocol, Adaptive Credit Allocation, and Statistical Multiplexing, SIGCOM 94—Aug, 1994.

T.V. Lakshman, et al., The Drop from Front Strategy in TCP and in TCP over ATM, 1996 IEEE.

Ming–Jeng Lee, et al., A Design Algorithm for Reconfigurable ATM Networks, 1993 IEEE.

Professor Dr.–Ing. Paul J. Kuhn, Teletraffic Science and Engineering, vol. 1b, and Jacques Labetoulle, *The Fundamental Role of Teletraffic in the Evolution of Telecommunications Networks*, vol. 1b, Jun. 1994.

Soung C. Liew, et al., *Comparison of Buffering Strategies of Asymmetric Packet Switch Modules*, IEEE Journal on Selected Areas in Communications, vol. 3, Apr. 1991.

B.A. Mukrucki, *On the Performance of Submitting Excess Traffic to ATM Networks*, BellSouth Telecommunications, CH2980–1/91/0000–0281, 1991 IEEE.

B.A. Makrucki, Explicit Forward Congestion Notification in ATM Networks, BellSouth Telecommunications, High–speed Communication Networks, p. 73, Ed. H. Perros, Plenum Press, New York, 1992.

P. Martini, et al., *Real–time Communication in DQDB—A Comparison of Different Strategies*, University of Paderborn, Germany, 0742–1303/92, 1992 IEEE.

R. Melen, et al., *Multirate Distribution Networks*, IEEE Transactions on Communications, vol. 41, No. 2, Feb. 1993.

D. Mitra, *Asymptotically Optimal Design of Congestion Control for High Speed Data Networks*, IEEE Transactions on Communications, vol. 40, No. 2, Feb. 1993.

J. Murphy, et al., *Bandwidth Allocation by Pricing In ATM Networks, Broadband Communications*, II (C–24), S Thome & A. Casaca (Editors), Elsevier Science B.V. (North Holland) 1994, p. 333.

P. Newman, *ATM Technology for Corporate Networks*, IEEE Communications, 0163–6804, Apr. 1992.

P. Newman, ATM Local Area Networks—*Lan emulation offers a best–effort, connectionless, packet transfer service at the MAC sublayer, implemented on top of a connection–oriented ATM network*, 0163–6804 IEEE Communication, Mar. 1994.

R.T. Olsen, et al., *Implementation of a Fast Virtual Channel Establishment Method for ATM Networks*, Computer Sciences Dept., University of Wisconsin–Madison, 0743–166X, IEEE Communications, 1993.

*Australian Telecommunication Research*, ISSN 00012777, vol. 26, No. 1992.

IEEE Infocom '90, *The Conference on Computer Communications*, 9th Annual Joint Conference of the IEEE Computer & Communications Societies, Jun. 3–7, 1990, San Francisco, CA.

R. Jain, *Myths About Congestion Management in High–speed Networks*, Internetworking Research & Experience, vol. 3, 101–113 (1992).

R. Melen, et al., *Nonblocking Multirate Distribution Networks*, Computer & Communications Research Ctr., Washington Univ., St. Louis, CH2826–5/90/0000/1234, IEEE 1990.

K. Sohraby, *Input Selective Cell Tagging and discarding with MMPP Traffic Model for BISDN/ATM Congestion Control*, AT&T Bell Laboratories, 0–7803–0917–0/93, IEEE, 1993.

R.J. Souza, et al., *GIGAswitch System: A High–performance Packet–switching Platform*, Digital Technical Journal, vol. 6 No. 1, Winter 1994.

J.S. Turner, *Bandwidth management in ATM Networks Using Fast Buffer Reservation*, Washington University, Australian Broadband Switching and Services symposium, Melbourne, Jul. 15–17, 1992.

J.S. Turner, Manintaining High Throughput During Overload in ATM Switches, Washington University, 0743–166X/96, IEEE 1996.

J.S. Turner, An Optimal Nonblocking Multicast Virtual Circuit Switch, 0743–166X/94, IEEE 1994.

J. Yi, et al., *Analysis of Multimedia Traffic Queues with Finite Buffer and Overload Control, Part II: Applications*, CH3133–6/92/0000–0848, IEEE 1992.

N. Yin, et al., *A Dynamic Rate Control mechanism for Source Coded Traffic in a Fast Packet Network*, 0733–8716/91/0900–1003, IEEE 1991.

QPSX Jan. 13, 2005 ASX Announcement: *QPSX Announces Litigation Funding Agreement with IMF*, QPSX Ltd (CAN 083 702 907).

Summary Minutes, T1 Services, Architure, and Signaling Technical Subcommittee (T1S1) Session, Dallas, Texas, Nov. 8, 1991.

J.S. Turner, *A Proposed Bandwidth Management and Congestion Control Scheme for Multicast ATM Networks*, Computer & Communications Research Ctr., Washington University, St. Louis, Missouri, May 23, 1997.

S.S. Abeysekera, et al., A Comprehensive Analysis of Stuff Threshold Modulation Used in Clock–Rate Adaptation Schemes, 0090–6778/98, IEEE 1998.

N. Clarke, et al. *ATM Switching Tables*, Australian Telecommunications Research Institute, Curtin University of Technology, Perth Australia, ACM SIOG COMM, Computer Communication Review, Australian Telecommunication Networks & Applications Conference, Melbourne, Dec. 5–7, 1994.

J. Hullett, et al. *Packet Discard Strategy of Congestion Control of ATM Data Networks*, Australian Telecommunications Research Institute, Curtin University of Technology, Perth Australia, ACM SIOG COMM, Computer Communication Review, Australian Telecommunication Networks & Applications Conference, Melbourne, Dec. 5–7, 1994.

Z.L. Budrikis, et al., *A Generic Flow Control Protocol for B–ISDN*, A.T.R. vol. 26, No. 2, 1992.

C. Baransel, et al. *Routing in Multihop Packet Switching Networks: Gb/s Challenge*, IEEE Network, May/Jun. 1995.

E. Monteiro, et al., *A fairness analysis of LAN/WAN protocol relays*, Computer Network and ISDN Systems, vol. 26, No. 3, Nov. 1993.

M. Buddhikot, et al., *Design of a large scale multimedia storage server*, Computer Networks and ISDN Systems, 1994.

P. Butler, et al., *Noniterative Automatic Equalization*, IEEE Transactions on Communications, vol. Com–23, No. 6, Jun. 1975.

A. Cantoni, et al., *Linear Minimum Mean–Square Error Estimators Applied to Channel Equalization*, IEEE Transactions on Communications, Apr. 1977.

A. Cantoni, et al., *Properties of the Eigenvectors of Persymmetric Matrices with Applications to Communication Theory*, IEEE Transactions on Communications, vol. Com–24, No. 8, Aug. 1976.

A. Catoni, et al., *Stability of Decision Feedback Inverses*, IEEE Transactions on Communications, vol. Com–24, No. 9, Sep. 1976.

J. Chin, et al., *Phase Jitter=Timing Jitter?*, IEEE Communications Letter, vol. 2, No. 2, Feb. 1998.

I. Cidon, et al., *Analysis of Multi–Path Routing*, IEEE/ACM Transactions on Networking, vol. 7, No. 6, Dec. 1999.

A. Dailianas, et al., *Real–time admission control algorithms with delay and loss guarantees in ATM networks*, Computer Communications, 1996.

D. Mitra, et al. *Erland Capacity and Uniform Approximations for Shared Unbuffered Resources*, IEEE/ACM Transactions on Networking, vol. 2, No. 6, Dec. 1994.

E. Monteiro, et al., *LAN/WAN interconnection congestion control in X.25 protocol relays*, Annuals of telecommunications. vol. 44, No. 1–2, 1994.

M. Hill, et al., *A Frequency Steered Phase–Locked loop*, IEEE Transactions on Communications, vol. 45, No. 6, Jun. 1997.

M. Hill, et al., *Precise All–Digital Frequency Detector for High Frequency Signals*, IEEE Transactions on Communications, vol. 48, No. 11, Nov. 2000.

S. Hinrichs, *Connection recource management for compiler–generated communication*, Concurrency Practice and Experience, vol. 9, Feb. 1997.

I. Ismail, *Bandwidth problems in high–speed networks*, IBM J. Res. Develop., vol. 44, No. 6, Nov. 2000.

M. Hill, et al., *asynchronous transfer mode receiver*, IEEE Proceedings–E, vol. 139, No. 5, Sep. 1992.

J. Chin, et al., *Phase Jitter= Timing Jitter?*, IEEE Communications Letters, vol. 2, No. 2 Feb. 1998.

G. Mercankosk, et al., Establishing a Real Time VBR Connection over an ATM Network, 0–7803–3336–5/96, IEEE 1996.

G. Mercankosk, et al., Extended Distributed Queueing for Integrated Services, 0733–8716/93, IEEE 1993.

J. Walker, et al., Determining Parameters to Minimize Jitter Generation in the SRTS Method, 0090–6778/98, IEEE 1998.

S.S. Abeysekera, et al., A Comprehensive Analysis of Stuff Threshold Modulation Used in Clock–Rate Adaptation Schemes, 0090–6778/98, IEEE 1998.

K. Qian, et al., An efficient algorithm for multimedia call–admission controlm Multimedia Systems, Springer–Verlag 1996.

A. Mehaoua, et al., Performance analysis of cell discarding techniques for best effort video communications over ATM networks, Computer Networks & ISDN Systems, Elsevier Science B.V., 1998.

G. Mercankosk, et al., Extended Distributed Queueing for Integrated Services, IEEE, vol. 11, No. 8, Oct. 1993.

T. Moors, et al., ATM Receiver Implementation Issues, IEEE, vol. 11, No. 2, 1993.

P. Newman, ATM Local Area Networks: Lan emulation offers a best–effort connectionless, packet transfer service at the MAC sublayer, implemented on top of a connection–oriented ATM Network, IEEE Communications Magazine, Mar. 1994.

S. Norden, Analyzing the performance of deferred reservations, 2004 Elsevier B.V.

J.C. Pasquale, The multimedia multicasting problem, Multimedia systems, Springer–Verlag 1998 (6:43–59).

M. Hill, et al., Design and Implementation of an ATM Receiver, Proc. 3rd Int'l IFIP WG6.1/6..4 Workshop on Protocols for High Speed Networks, pp. 177–92, May 1992, Networking Research Laboratory, University of Western Australia, Nedlands, Australia.

L.K. Reiss, et al., Performance analysis of an adaptive bandwith reservation scheme for ATM virtual path traffic, Elsevier Science B.V. 1996 (SSDI 0169–7552 (94)00109–X).

I. Ryoo, et al., Design and performance analysis of a new RTM algorithm for VBR traffic in ATM networks, 1996 Elsevier Science B.V. (PII S0140–3664(98)01061–4).

I. Cidon, et al., Bandwidth reservation for bursty traffic in the presence of resource availabilty uncertainty, 1999 Elsevier Science B.V. (PII: S0140–3664(99)00059–6).

K. Shiomoto, et al., Loss and Delay Analysis of Dynamic Flow Setup in ATM Networks, IEICE Trans, Commun., vol. E81–B, No. 5, May 1998.

A. Danthine, et al., and ED by O. Spaniol, Architecture And Protocols For High–Speed Networks, Kluwer Academic Publishers, Sydney Australia, Sep. 12, 1995.

I. Thng, et al., Low timing Sensitivity Receiver Structures for CAP, IEEE, vol. 48, No. 3, Mar. 2000.

J. Tuthill, et al., Optimum Precompensation Filters for IQ Modulation Systems, IEEE, vol. 47, No. 10, Oct. 1999.

R.J. Vetter, ATM Concepts, Architectures, and Protocols, Communications of the ACM, vol. 38, No. 2, Feb. 1995.

J. Walker, et al., Jitter Analysis for Two Methods of synchronization for External Timing Injection, IEEE, Vo. 44, No. 2, Feb. 1996.

J. Walker, et al., Modeling of the Synchronization Process Jitter Spectrum with Input Jitter, IEEE, vol. 47 No. 2, Feb. 1999.

J. Walker, et al. Determining Parameters to Minimize Jitter Generation in the SRTS Method, IEEE, vol. 46, No. 1, Jan. 1998.

J. Walker, et al., A New Reconstruction Approach in the SRTS Method, IEEE, vol. 51, No. 11, Nov. 2003.

Y.C. Chen, et al., Design and analysis of delay control for CBR services in ATM networks, Elsevier Science B.V., PII S0140–3664(98)00119–4, 1998.

You–Ze Cho, et al., Performance Analysis of Fast Reservation Protocols for Burst–Level Bandwidth Allocation in ATM Networks, IEICE Trans. Commun., vol. E84–B, No. 2, Feb. 2001.

J. Walter, Call Waiting at QPSX—New Call–Centre technology is being backed by Kerry Packer and Richard Pratt, BRW, p. 94, Jan. 8, 2002.

ASX Company Announcement re QPX Annual Report/Notice of AGM—Annual Report Sep. 26, 2003.

T. Moors, et al., 802.6 Medium Access Control Receiver Implementation Issues, Australian Broadband Switching and Services Symposium '91, Sydney, Jul. 3–5, 1991.

J. Hulley, et al. Packet Discard Strategy for Congestion Control of ATM Data Networks, Australian Telecommunication Networks & Applications Conference, Melbourne, Dec. 5–7, 1994.

Z. Budrikis, et al., Performance evaluation of controlled cell transfer service in ATM LAN, Comput Syst Sci & Eng (1996) 6:353–360, 1996.

M. Hill, et al., Asynchronous transfer mode receiver, IEE Proceedings–E, vol. 139, No. 5, Sep. 1992.

G. Mercankosk, et al., Extended Distributed Queueing for Integrated Services, IEEE Journal, vol. 11, No. 8, Oct. 1993

G. Mercankosk, et al., Characterization of a CBR Connection over a Channel with Known Bounded Delay Variation, 0743–166X/93 IEEE 1993.

P.H. Gerrand, On the intimate relationship between standards development, research and development, tertiary education and commercial opportunities in telecommunications, IREE Monitor, Sep. 1991.

Offspring Ventures Pty Ltd. Historical Company Extract, ID111 072 943, May 23, 2006.

Martin Hill, et al., *Design and Implementation of an ATM Receiver*, Proc. 3rd Int'l IFIP WG6.1/6.4 Workshop on Protocols for High–Speed Networks, pp. 177–92, May 1992.

QPSX 2005 Annual Report.

QPSX Developments 5 Pty Ltd. Historical Company Extract, ID 000 239 666, Section 1274B, May 23, 2006.

QPSX Developments 5 Pty Ltd. Historical Company Extract, ID 101 935 782, Section 1274B, May 23, 2006.

QPSX Developments 5 Pty Ltd. Historical Company Extract, ID 110 679 331, Section 1274B, May 23, 2006.

QPSX Developments 5 Pty Ltd. Historical Company Extract, ID 111 072 989, Section 1274B, May 23, 2006.

QPSX Developments 5 Pty Ltd. Historical Company Extract, ID 111 072 925, Section 1274B, May 23, 2006.

QPSX Developments 5 Pty Ltd. Historical Company Extract, ID 110 046 565, Section 1274B, May 23, 2006.

QPSX Developments 5 Pty Ltd. Historical Company Extract, ID 110 663 404, Section 1274B, May 23, 2006.

QPSX Developments 5 Pty Ltd. Historical Company Extract, ID 083 702 987, Section 1274B, May 23, 2006.

Z.L. Budrikis, et al., *Architecture and Protocols for High–Speed Networks*, Kluwer Academic Publishers, Sep. 12, 1995.

J. Chin, et al., *Comparison of Two Frequency Justification Schemes for Timing Transfer–Variable versus Fixed Frame Length*, APCC 1997.

N. Clarke, et al., *ATM Switching Tables*, Australian Telecommunications Networks & Applications Conference, Melbourne 5–7, Dec. 1994.

G. Mercankosk, et al., *Spacing and Multiplexing in ATM Networks*, Australian Telecommunications Networks & Applications Conference, Melbourne 5–7, Dec. 1994.

Z.L. Budrikis, et al., *A Generic Flow Control Protocol for B–ISDN*, Oct. 20, 1992, A.T.R. vol. 26 No. 2, 1992.

P.C. Wong, et al., A Programmable Rate–Based Scheduler (PRS) for ATM Switches and Multiplexers, IEEE Aug. 1997.

G. Mercankosk, et al., *Provision of Real–time Services over ATM using AAL type 2*, ACM Jul. 1998.

J. Chin, et al., *Phase Jitter—Timing Jitter?*, IEEE vol. 2, No. 2, Feb. 1998.

G. Mercankosk, et al., *Establishing a Real Time VBR Connection over an ATM Network*, IEEE May 1996.

J. Walker, et al., Determining Parameters to Minimize Jitter Generation in the SRTS Method, IEEE Transactions on Communications, vol. 46, No. 1, Jan. 1998.

S.S. Abeysekera, et al., *A comprehensive analysis of Stuff Threshold Modulation Used in Clock–Rate Adapatation Schemes*, IEEE Transactions on Communications, vol. 46, No. 8, Aug. 1998.

*QPSX Limited ACN 083 702 907* v. *Ericsson Australia Pty Ltd CAN 004 071 854*, 2004 FCA 1134, Federal Court of Australia, J. French, Aug. 1, 2004.

*QPSX Limited CAN 083 702 907* v. *Ericsson Australia Pty Ltd CAN 004 071 854*, 2004 FCA 1302, Federal Court of Australia, J. French, Oct. 12, 2004.

T. Lyon, *Simple and Efficient Adaptation Layer (SEAL)*, T1S1.5AAL, Aug. 12–16, 1991.

CCITT Recommendation I. 150, *B–ISDN Asynchronous Transfer Mode Functional Characteristics*, Geneva, Jun. 1992.

CCITT Study Group XVIII Report R 116, Period 1989–1992.

Recommendation L371, *Traffic Control and Congestion Control in B–ISDN* (Geneva 1992).

Recommendation L431, *Primary Rate User–Network Interface—Layer 1 Specification*, 1984, amd. 1988).

ITU–T Recommendation I.361, *Integrated Services Digital Network(ISDN) Overall Network Aspects and Functions, B–ISDN ATM Layer Specification*, Mar. 1993.

ITU–T Recommendation I.362, *Integrated Services Digital Network (ISDN) Overall Network Aspects and Functions, B–ISDN ATM Adaptation Layer (AAL) Functional Description*, Mar. 1993.

ITU–T Recommendation I.363, *Integrated Services Digital Network (ISDN) Overall Network Aspects and Functions, B–ISDN ATM Adaptation Layer (AAL) Specification*, Mar. 1993.

ITU–T Recommendation I.371, *Integrated Services Digital Network (ISDN) Overall Network Aspects and Functions, Traffic Control and Congestion Control in B–ISDN*, Mar. 1993.

ITU–T Recommendation I.432, *Integrated Services Digital Network (ISDN) ISDN User–Network Interfaces, B–ISDN User–Network Interface Physical Layer Specification*, Mar. 1993.

J.S. Turner, *A Proposed Bandwidth Management and Congestion Control Scheme for Multicast ATM Networks*, Technical Report WUCCRC–01–1, Computer and Communications Research Center, Washington University, St. Louis, Apr. 8, 1991.

J.S. Turner, *Design of Local ATM Networks*, Technical Report, Computer Science Department, Washington University, St. Louis, 1992.

Tom Lyon, *Simple and Efficient Adaptation Layer (SEAL)*, ANSI TISI.5/91–292, Aug. 7, 1991.

C.J. O'Neill, *Corporation of ATM Network Congestion Control Methods*, Australian Telecommunication Research (A.T.R.), vol. 26, No. 2, 1992, pp. 31–38.

ITU Recommendation I.311, "B–ISDN General Network Aspects," Jun. 1991.

ITU Recommendation I.361, "B–ISDN ATM Layer Specification," Jul. 1992.

ITU Recommendation I.363, "B–ISDN ATM Adaptation Layer (AAL) Specification," 1991.

ITU Recommendation I.371, "Traffic Control and Congestion Control in B–ISDN," 1992.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 and 11-13 is confirmed.

Claims 4-10 and 14-19 were not reexamined.

* * * * *